(12) United States Patent
Coogan et al.

(10) Patent No.: US 7,587,250 B2
(45) Date of Patent: Sep. 8, 2009

(54) CONTROLLER WITH CONFIGURABLE CONNECTIONS BETWEEN DATA PROCESSING COMPONENTS

(75) Inventors: James J. Coogan, Des Plaines, IL (US); Virgil Seribo, Deerfield, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 321 days.

(21) Appl. No.: 10/897,416

(22) Filed: Jul. 22, 2004

(65) Prior Publication Data

US 2005/0033453 A1 Feb. 10, 2005

Related U.S. Application Data

(60) Provisional application No. 60/489,306, filed on Jul. 22, 2003.

(51) Int. Cl.
*G05B 11/01* (2006.01)
*G05B 13/02* (2006.01)
*G05B 15/00* (2006.01)
*G06F 15/177* (2006.01)
*G06F 9/44* (2006.01)

(52) U.S. Cl. .............................. 700/17; 700/9; 700/19; 700/42; 700/83; 700/275; 715/734; 715/740; 715/965; 717/171

(58) Field of Classification Search ................. 700/1–4, 700/6–12, 17, 19, 42, 83, 276–278, 299, 700/300, 275, 282–284; 236/1 R, 1 C; 715/734, 715/735, 736, 740, 771, 773, 961, 965; 717/168, 717/171
See application file for complete search history.

(56) References Cited

U.S. PATENT DOCUMENTS

| | | | | |
|---|---|---|---|---|
| 3,976,981 A * | 8/1976 | Bowden | ........................ | 700/10 |
| 4,455,619 A * | 6/1984 | Masui et al. | ................. | 345/530 |
| 4,721,448 A * | 1/1988 | Irish et al. | .................... | 425/144 |
| 5,392,207 A * | 2/1995 | Wilson et al. | ................. | 700/64 |
| 5,819,845 A * | 10/1998 | Ryu et al. | .................... | 165/254 |
| 6,510,352 B1 * | 1/2003 | Badavas et al. | ............... | 700/19 |
| 2002/0151987 A1 * | 10/2002 | Mendez | ........................ | 700/8 |

* cited by examiner

*Primary Examiner*—Sean P Shechtman

(57) ABSTRACT

A controller with configurable connections between data processing components is provided. In one embodiment, the controller includes a number of configurable inputs and outputs that may be used with digital and/or analog signals. The controller includes a data processor with a plurality of data processing components. The inputs and outputs are configurable to the plurality of data processing components and transfer of processed data between the plurality of data processing components is also configurable.

21 Claims, 16 Drawing Sheets

| General | Node Object | FLPOOP |
| Status | Config | Lon Props |

PID2Cfg (F)
- reverse: True
- unit: temperature — 326
- outMinPct: 0.0
- outMaxPct: 100.0
- tempDBand: 0.0
- pctDBand: 0.0
- bias: 0.0

PID2Cntr (F)
- krTemp temperatureGain: 1.5
- krPct gain: 0.0
- ti: 60.0
- td: 0.0

PID2DisSrc (F)
- type: di4 — 328
- value: False — 330

PID2PVSrc (F)
- sourceType: pviTemp — 332
- sourceNum: 3.0 — 334

FIG. 11 D

```
┌─General─┬─Node Object─┬─FLPOOP─┐
├─Status─┬─Config─┬─Lon Props─┤
                          type        [none     ▼]
    AO1DisSrc {F}        value       [false    ▼]
                       enableDelay   [0.0]           ⟵ 358
                                                     ⟵ 360
                        minPercent   [0.0]
    AO1InRange {F}
                        maxPercent   [33.0]          ⟵ 354
                                                     ⟵ 356
                        minPercent   [0.0]
    AO1OutRange {F}
                        maxPercent   [100.0]
                                                     ⟵ 346
                        sourceType   [pid      ▼]
    AO1Src {F}          sourceNum    [2.0]           ⟵ 348
                        nciPct       [0.0]
```

FIG. 11 G

```
┌─General─┬─Node Object─┬─FLPOOP─┐
├─Status─┬─Config─┬─Lon Props─┤
                          type        [none     ▼]
    AO2DisSrc {F}        value       [false    ▼]
                       enableDelay   [0.0]           ⟵ 366
                                                     ⟵ 368
                        minPercent   [33.0]
    AO2InRange {F}
                        maxPercent   [100.0]         ⟵ 362
                                                     ⟵ 364
                        minPercent   [0.0]
    AO2OutRange {F}
                        maxPercent   [100.0]
                                                     ⟵ 350
                        sourceType   [pid      ▼]
                                                     ⟵ 352
    AO2Src {F}          sourceNum    [2.0]
                        nciPct       [0.0]
```

FIG. 11 H

| General | Node Object | FLPOOP |
| Status | Config | Lon Props |

AO3DisSrc {F}
- type: none
- value: false
- enableDelay: 0.0

AO3InRange {F}
- minPercent: 0.0
- maxPercent: 100.0

AO3OutRange {F}
- minPercent: 0.0
- maxPercent: 100.0

AO3Src {F}
- sourceType: pid — 366
- sourceNum: 1.0 — 368
- nciPct: 0.0

FIG. 11 I

CONTROLLER WITH CONFIGURABLE CONNECTIONS BETWEEN DATA PROCESSING COMPONENTS

This application claims the benefit of U.S. Provisional Application Ser. No. 60/489,306 filed Jul. 22, 2003.

FIELD OF THE INVENTION

The present invention relates to distributed processing in automation control systems, and in particular, to automation control systems that use electronic controllers to control system or device operation.

BACKGROUND OF THE INVENTION

Automation control systems are well-known. Such systems include building automation systems for controlling environmental systems, elevator banks, and the like. Other automation control systems include industrial control, food processing, and transportation systems. These systems receive data from sensors that are evaluated to determine control actions to take in order to bring about some condition or perform some operation. For example, an environmental control system uses sensors to detect environmental conditions and system parameters throughout a building or other space that is environmentally regulated to determine control actions for maintaining or bringing the regulated space to some defined condition.

Generally, a system used to control the environmental conditions within a building is configured as a distributed network. That is, a single network is created that includes a network manager that is operably connected to a number of local controllers distributed throughout the network. The network manager manages and coordinates the operation of the local controllers by issuing control parameters and receiving data indicating the operating condition of the local controllers. The local controllers receive sensor input and control parameters and control the operation of components to effect the specific task that they are programmed to control.

The various components need not be provided from a single manufacturer in order to be incorporated into a network. For example, interoperability of components from various manufactures may be provided by following "standard" communications protocols that have evolved and which are used by a number of different manufacturers. By using devices with the same protocol, a consumer can be assured that the devices will be able to communicate with the other devices of the consumer's system once installed. One such protocol is the LonTalk protocol, also known as the ANSI/ EIA 709-1 Control Networking Standard.

The LonTalk protocol is a layered, packet based, peer-to-peer communications protocol designed specifically for control systems. By using devices with a shared protocol, a consumer ensures that a device, regardless of its manufacturer, will be able to send and receive messages from other devices in the network. To this end, the protocol ideally enables communication without prior detailed knowledge of the topology of the network. Accordingly, systems using the LonTalk protocol maintain control functions within the various devices while sharing data with other devices in the system. Such a system may be referred to as an information-based control system. Accordingly, a device may be used in a variety of different applications.

Similarly, local controllers are used in a variety of applications. For example, a building including a number of laboratories may have dedicated local controllers for each laboratory. One laboratory may be used for chemical mixing. In such a case, it may be desired to maintain the laboratory at a pressure lower than surrounding areas so that any noxious fumes are extracted through the ventilation system and not allowed to seep into the surrounding areas. In contrast, a laboratory functioning as a clean room may require positive pressure in comparison to the surrounding areas so that only filtered air is introduced into the laboratory. The building may include a conference area that only needs to be environmentally controlled within a narrow temperature band if it is occupied, an atrium that must be constantly maintained within a narrow temperature band, and offices that must be maintained within a narrow temperature band only during normal work hours with the ability to maintain the narrow temperature band at all other times if the office is occupied.

In all of the above applications, and others not mentioned, the specific local controller must be able to receive input from the network that may include set points, dead bands, etc., as well as input from a variety of sensors. The sensors are temperature sensors, infrared body detectors, position indicators, water flow meters, air flow meters, water pressure meters, air pressure meters, and the like. Position indicators are devices that generate a signal that corresponds to the position of a switch, valve, or vent opening so the system controller may determine whether particular lights, fans, vents, or blower motors are operating or open. The data that are generated by the sensors may be provided in digital or analog form. Moreover, the signal may merely indicate one of two conditions, such as a position of open or shut, or it may further indicate a condition between two extremes, such as the extent to which the valve is open.

A similar situation arises with the output that is used to control the various components. A controller may be used to control lights, motors, valve position, and motor operation. All of these components may use a variety of control signals.

Accordingly, it is known in the prior art to provide controllers that are configurable to accept a number of different inputs and outputs. Typically, a set of terminals are connected to a particular processing component within the controller. When installing a controller, an installer selects the appropriate terminal based upon the specific sensors and components, and connects the local controller. Thus, the local controller is configurable to accept a variety of inputs and to provide a variety of outputs.

The ability to configure the input and output terminals allows a single type of local controller to be used with a variety of sensors and components and greatly increases the flexibility of the local controller. However, such local controllers are not necessarily useful in all of the different applications in which local controllers are used. This is because the various applications in which a local controller is used require a controller with different data processing modules. One approach to providing different data processing modules is to provide a controller that is pre-programmed with data processing modules that are directed to a specific application. Thus, when installing a controller in a system, the field technician need only attach wires to the proper input/output terminal. Such pre-programmed controllers are easy to install. However, each application requires a different controller. Therefore, a large inventory of controllers must be maintained, or installation may be delayed until an appropriate controller is ordered and received. Moreover, if the use of a room is changed and requires different functionality, a new controller must be obtained.

Another approach is to use field programmable controllers. This type of controller addresses some of the shortcomings of the pre-programmed controllers as they may be used in a wide variety of applications. Once installed, the data processing modules of the controller are programmed for the particular application. Thus, a single controller may be used in a variety of applications. Moreover, if the use of an area changes and requires a different functionality, the controller need not be replaced. In addition to possibly altering inputs and outputs, the controller only needs to be reprogrammed to realize the different functionality. Of course, the need to program the controllers increases the complexity of the installation process.

What is needed is a controller that includes configurable data processing modules such that the controller could be used for a number of different applications. It would be beneficial if the controller did not require complete programming of data processing modules at the time of installation. It would be further beneficial if the controller included configurable input and output modules.

SUMMARY OF THE INVENTION

A controller made in accordance with the principles of the present invention overcomes limitations previously encountered with local controllers. A local controller of the present invention includes the capability of configuring data processing modules that have been pre-programmed into the local controller. In one embodiment, a user interface is provided that allows the user to configure the input(s) to the controller to be provided to one of a plurality of data processing components. The output of the data processing components may also be configured as an input to another of the data processing components or as a controller output.

The data processing modules within the controller may comprise modules of different types such as a plurality of proportional-integral-derivative (PID) modules, a data mapping module, and/or a statistic function module. The controller may further comprise a motor module.

The user interface may be in the form of a network tool. In operation, the network tool is used by a user to identify the network and sensor inputs to be provided to a controller. The network tool is further used to identify the data processing modules within the controller to which input received by the controller is to be routed. The output of the data processing modules is further configurable so as to direct the output of the data processing module to another data processing module and/or an output module.

It is an object of the present invention to allow a single controller to be used in a variety of applications without the need to re-program the controller.

It is an object of the present invention to provide a controller that includes a number of configurable data processing modules.

It is an object of the present invention to provide a plurality of PID modules within a single configurable controller.

These and other advantages and features of the present invention may be discerned from reviewing the accompanying drawings and the detailed description of the preferred embodiment of the invention.

BRIEF DESCRIPTION OF THE DRAWINGS

The present invention may take form in various system and method components and arrangement of system and method components. The drawings are only for purposes of illustrating exemplary embodiments and are not to be construed as limiting the invention.

DESCRIPTION OF THE INVENTION

Figure 1:
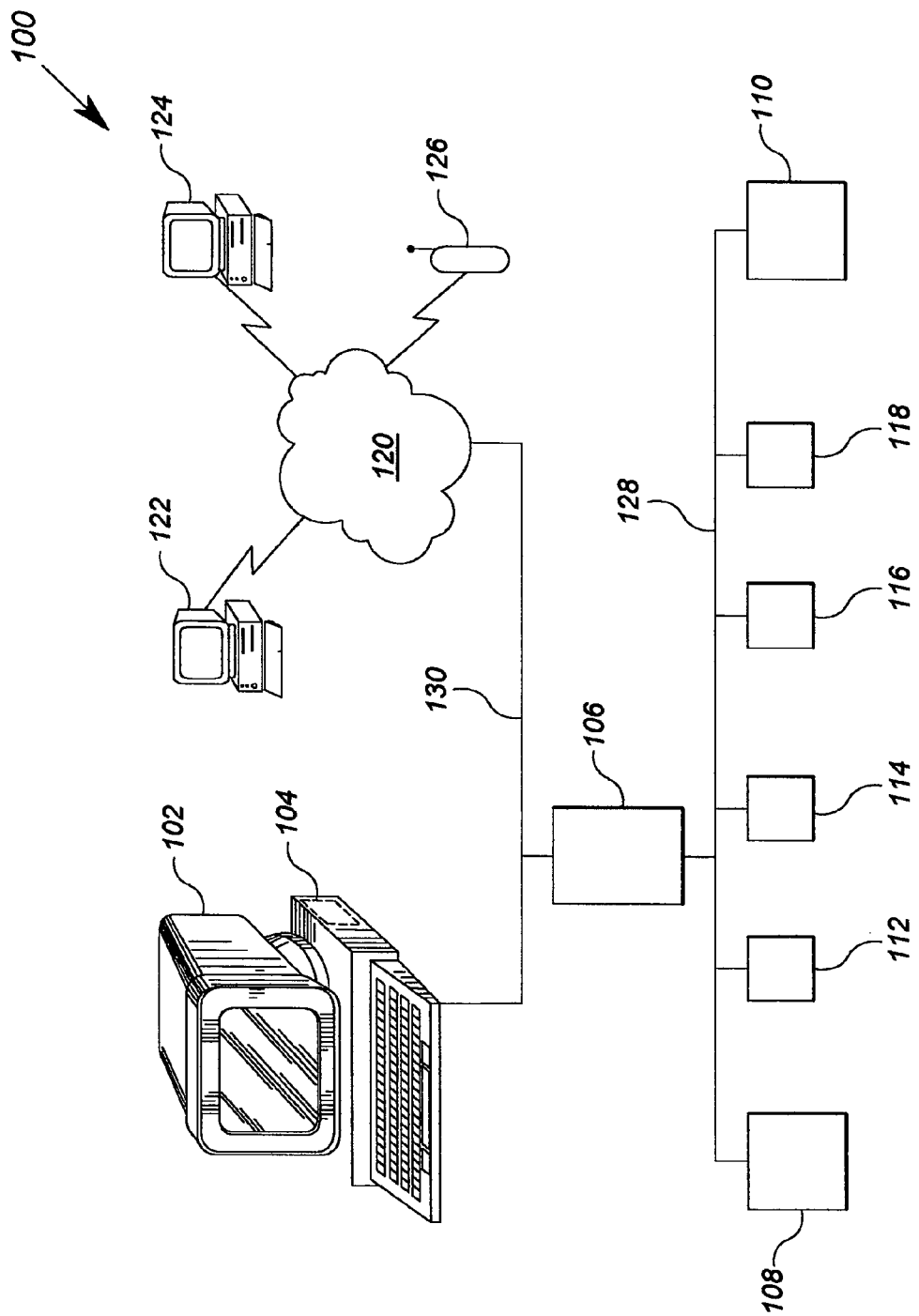
FIG. 1 shows a block diagram of a building control system in which the system and the method of the present invention may be used.

FIG. 1 shows an exemplary, representative block diagram of a building control system 100 that includes a supervisory control system 102, a system database 104, a network manager 106, programmable controllers 108 and 110, and a plurality of configurable controllers 112, 114, 116 and 118. Building control system 100 in this embodiment is accessible via a network 120 that permits access by a remote browser 122, a laptop computer 124 and/or a wireless device 126.

Each of the programmable controllers 108 and 110 and the configurable controllers 112, 114, 116, and 118 interfaces with the network manager 106 via a data network 128. The data network 128 is a low-level data network that in this embodiment employs the LonTalk protocol, also known as the ANSI/EIA 709-1 Control Networking Standard.

The network manager 106, which may suitably be a TALON® Network Manager commercially available from Siemens Building Technologies, Inc. of Buffalo Grove, Ill., is operably connected to the supervisory computer 102 through a control system network 130. The control system network 130 may be any communications protocol including Ethernet, TCP/IP, BACnet, HTTP and XML. The network manager 106 provides integrated control, supervision and network management services for the monitoring and control devices which in this embodiment comprise the programmable controllers 108 and 110 and the configurable controllers 112, 114, 116, and 118.

The supervisory computer 102 in this embodiment comprises a TALONS® workstation commercially available from Siemens. The supervisory computer 102 may be used for database management, alarm management, and messaging service. The supervisory computer 102 is also used to set up and manage the components in the building control system 100.

Each of the configurable controllers 112, 114, 116 and 118 may be configured to provide direct digital control of a variety of mechanical equipment ranging from zone level control of variable air volume (VAV)/constant volume (CV), heat pumps, unit ventilators and fan coil units to air distribution units and mechanical units including spare point pick up of miscellaneous zone equipment. In an exemplary configuration shown in FIG. 2, the configurable controller 112 is configured to control equipment in a hot water converter system application.

The hot water converter system 132 includes the configurable controller 112, a water pump 134, a heat exchanger 136 and two hot water loads 138 and 140. The hot water loads 138 and 140 are used to supply heat to other systems. The amount of hot water supplied to the hot water loads 138 and 140 is controlled by the position of the control valves 142 and 144, respectively. The position of the control valves 142 and 144 may be manually set or may be controlled by another controller (not shown).

The hot water converter system 132 further includes two pressure sensors 146 and 148, a flow sensor 150 and a temperature sensor 152 which are operably connected to a set of input terminals on the configurable controller 112 that includes the input terminals 154, 156, 158 and 160. The configurable controller 112 also includes the output terminals 162, 164, 166 and 168. The output terminals 162 and 164 are operably connected to the water pump 134. The output terminals 166 and 168 are operably connected to a low range steam valve 17Q and a high range steam valve 172, respectively. The low range steam valve 170 and the high range steam valve 172 control the amount of steam that flows from the steam supply header 174 to the heat exchanger 136.

Figure 3:
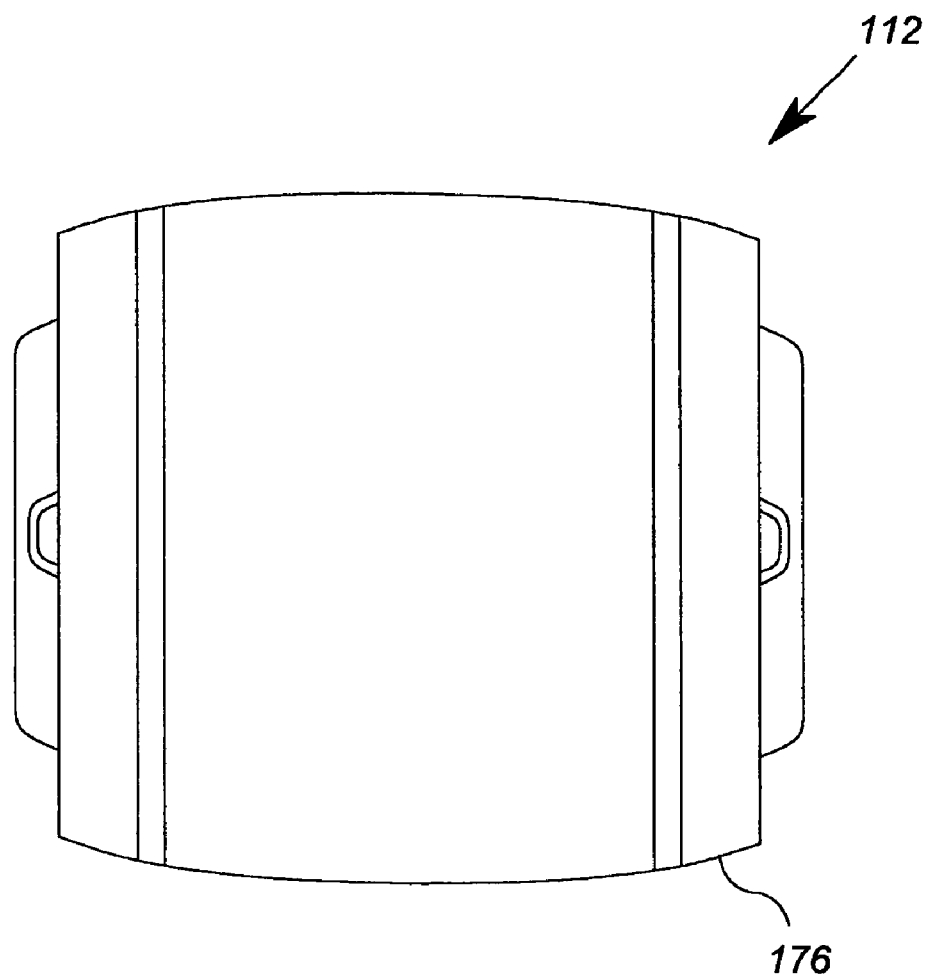
FIG. 3 shows the front housing portion of the configurable controller of FIG. 2.
Figure 4:
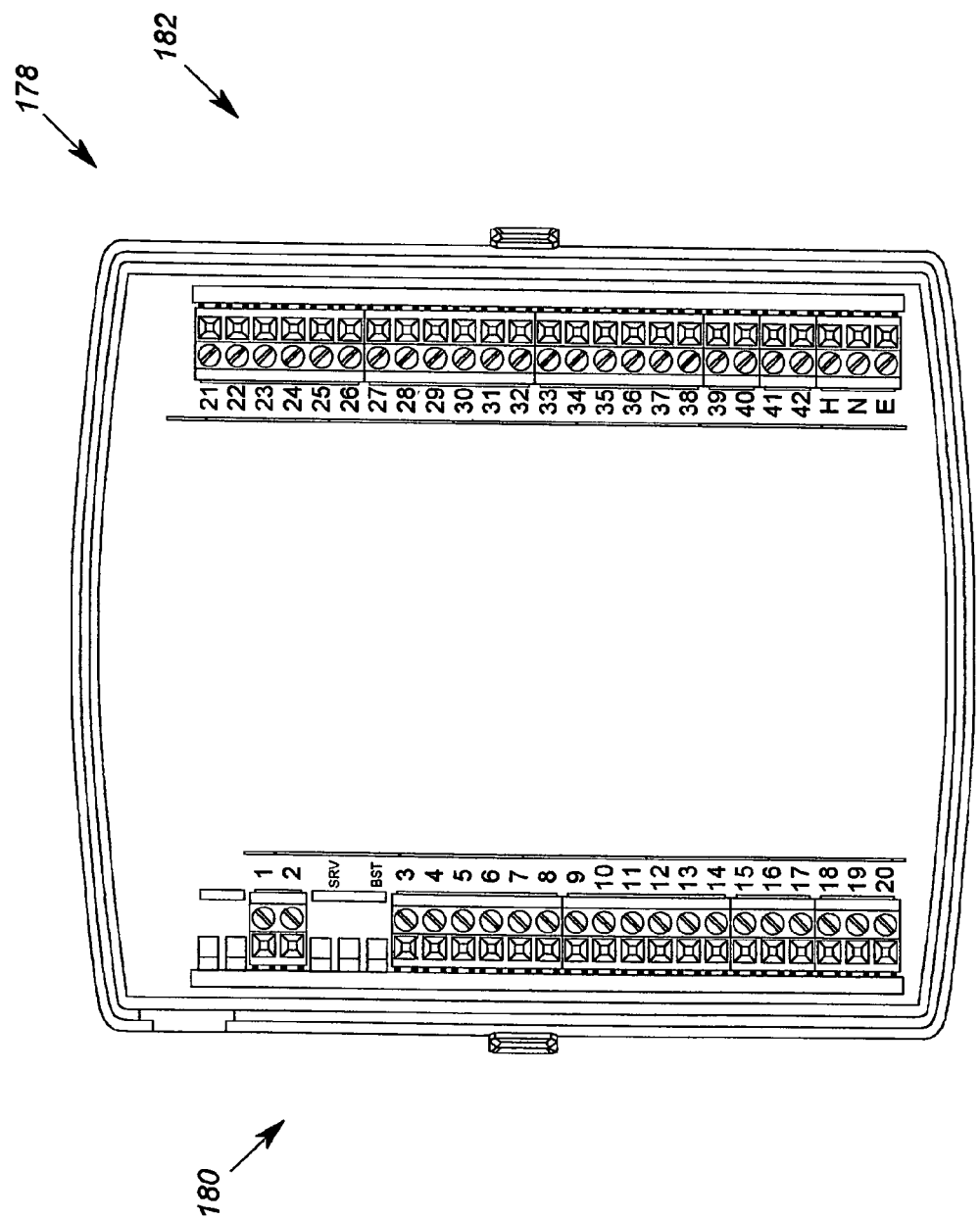
FIG. 4 shows the rear housing portion of the configurable controller of FIG. 2.

Referring to FIG. 3, the configurable controller 112, which may suitably be a PREDATOR® controller available from Siemens, comprises a front housing portion 176 and a rear housing portion 178 shown in FIG. 4. A set of input terminals 180 and a set of output terminals 182 are supported by the rear housing portion 178.

A processor (not shown) is also supported by the front housing portion 176 of the configurable controller 112. In this embodiment, the processor is a NEURON® 3150 processor commercially available from Echelon Corporation of San Jose, Calif. The processor is programmed with a plurality of components or modules. The programming of the processor may be accomplished using a Simulink® software package commercially available from The MathWorks, Inc. of Natick, Mass.

Figure 5:
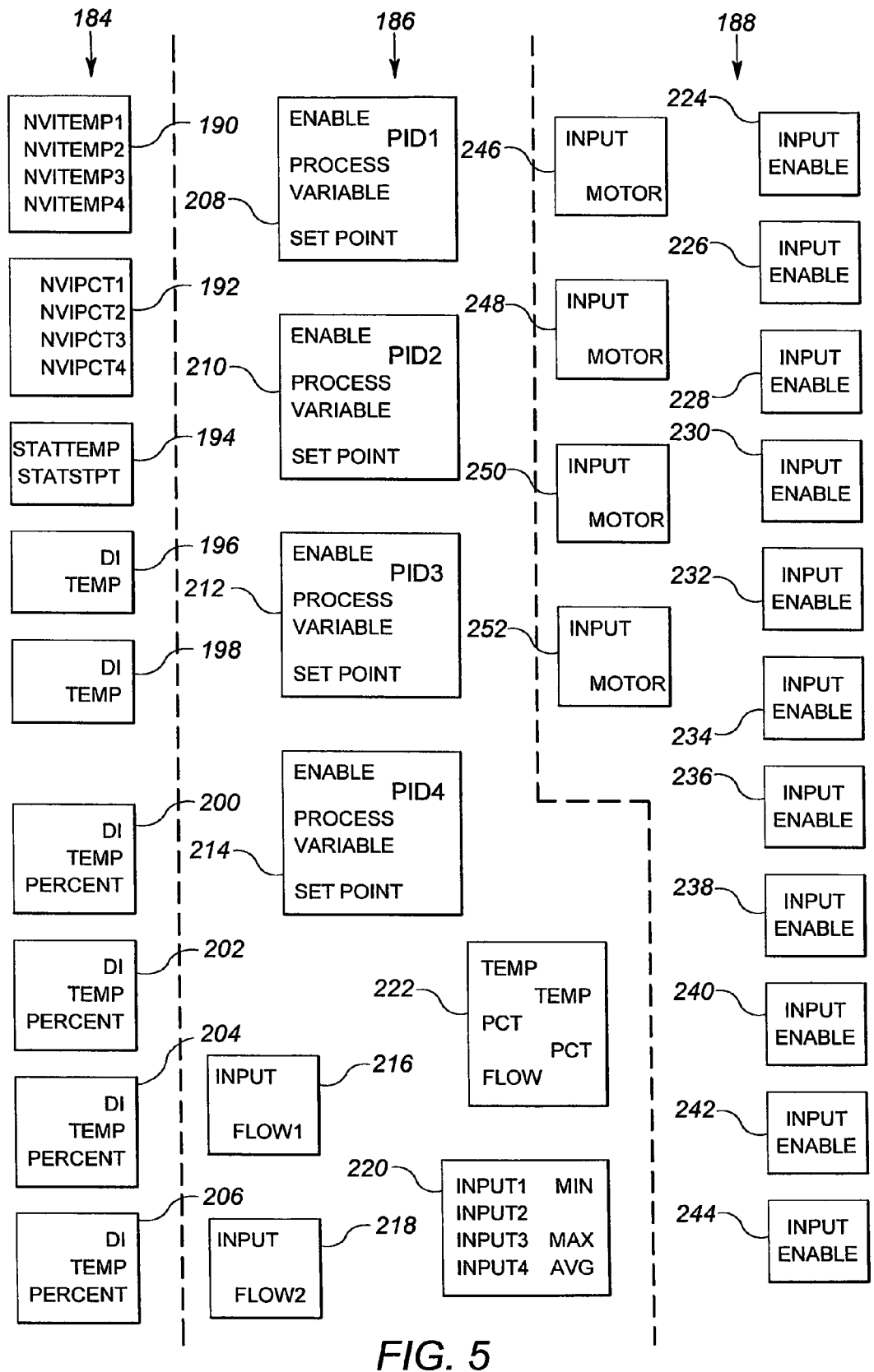
FIG. 5 shows a block diagram of the input, data processing and output components of the configurable controller of FIG. 2.

As shown in FIG. 5, the components may be generally categorized as input components 184, data processing components 186, and output components 188. The input components 184, data processing components 186, and output components 188 are programmed into a read only memory during the manufacturing process of the configurable controller 112. However, the logical connections of the inputs and outputs of the input components 184, data processing components 186, and output components 188 are not established during the manufacturing process. Accordingly, the logical connections of the inputs and outputs of the components may be configured at a later time, such as during field installation, in any one of a number of possible configurations. Thus, the configurable controller 112 may be used in a number of different applications.

The input components 184 are configured to receive signals from the input terminals 180 by means known to those of ordinary skill in the relevant art. The input components 184 include two network input modules and six non-network input modules including thermistor input modules and voltage input modules. The non-network input modules are configured to receive data from sensors that are monitoring various parameters.

In this embodiment, two network input modules, the network temperature input module 190 and the network percentage input module 192, are provided. The network input modules are used to receive inputs from the network that can be used by certain of the data processing components 186 as is described below.

The network temperature input module 190 is configured to receive up to four temperature inputs from the data network 128. This is indicated in FIG. 5 as language dependent names "nvitemp1" through "nvitemp4". The names are used in configuring the configurable controller 112 as is discussed in more detail below. The "n" indicates that the source of the value is the network. The "v" indicates that the value is a variable. The "i" indicates that the value is an input. The "temp" indicates that the value is a temperature parameter, and the last digit identifies the value as one of four values.

The network percentage input module 192 is configured to receive up to four percentage inputs from the data network 128. The names used with the identification of the values received by the network percentage input module 192, shown in FIG. 5 as "nvipct1" through "nvipct4", are similar to the names used with the network temperature input module 190. The difference is that in the network percentage input module 192, a "pct" designation is used in place of the "temp" designation, indicating that the value is a percentage.

The Staefa RTS input module 194 is configured to receive thermistor data and set point data from a Staefa TALON® RTS. This is shown in FIG. 5 as "stattemp" and "statstpt". In these names, the "stat" indicates the value is from a Staefa RTS, while the "temp" indicates that the value is a temperature, and "stpt" indicates that the value is a set point. The Staefa TALON® RTS is a thermistor type sensor that uses a 10,000 ohm resistor. The Staefa TALON® RTS also includes a set point slide that allows for the room temperature set point to be adjusted. A bypass button is also provided. The bypass button is used to indicate that a room is being occupied beyond the normal occupancy schedule. When connected to a controller, the Staefa TALON® RTS accordingly provides thermistor data, bypass data and set point data to the controller. The thermistor input is filtered by the Staefa RTS input module 194 over a period of time that in this embodiment is hard coded. In this embodiment, the bypass data is only used as an enable/disable signal for other components in the controller, and is not passed to the data network 128.

The thermistor input module 196 and the thermistor input module 198 are programmed to receive analog data indicative of temperatures from 100 K ohm thermistors. This is shown in FIG. 5 by the names "temp" in the thermistor input module 196 and the thermistor input module 198, which is a shorthand reference to the names "pvilnxTemp". The "pvi" indicates the value is a physical variable input. The "In" indicates that the value was received as an input by a module and the "x" identifies the module as one of six non-network input modules, with the thermistor input module 196 and the thermistor input module 198 being modules number 1 and 2 respectively. The "temp" indicates that the value is a temperature. The thermistor input module 196 and the thermistor input module 198 filter the input values received, and report the filtered value of the input. The reported value is designated as "nvolnxTemp", which is similar to the input value names discussed above with the exception that the "i" is replaced with an "o" indicating that the value is an output from the module. When used as a temperature input, the thermistor input module 196 is configured to filter the input.

The thermistor input modules 196 and 198 are also programmed to receive digital data. Digital data provided to the thermistor input modules 196 and 198 are designated as "pvilnxDI". The replacement of "Temp" with "DI" indicates that the value is a digital input. When digital data is received, the thermistor input modules 196 and 198 act as switches and provide the digital data as output data. The output data is named as "nvolnxDI", wherein the "o" in place of the "i" indicates that the value is an output from the identified module.

The voltage input modules 200, 202, 204 and 206 are programmed to receive an analog signal between 0 and 10 volts which is converted by the module to a percentage. The name of the voltage input data is "pvilnxPct". This name follows the convention for the thermistor input modules 196 and 198 with the exception that the "Pct" indicates that the value is a percentage. The voltage input modules 200, 202, 204 and 206 are also programmed to receive a current signal between 4 and 20 mA when a resistor is added to the circuit. The current input may be used as a temperature input. The voltage input modules 200, 202, 204 and 206 may also be used as a switch when a digital signal is received, similar to the thermistor input modules 196 and 198. The names for the current and digital inputs are similar to the names for the temperature and digital inputs for the thermistor input modules 196 and 198 with the exception that the "x" is replaced with numbers 3-6 to indicate the value is associated with the voltage input modules 200, 202, 204 and 206, respectively. The same naming convention is used with the data output from the voltage input modules 200, 202, 204 and 206 as was discussed above with respect to the thermistor input modules 196 and 198, with the addition of the name "pvoLnxPct" for the output of the percentage value. When used as a temperature or percentage input, the voltage input modules 200, 202, 204 and 206 are configured to filter the input over a period of time established by the user as discussed below.

The data processing components 186 include the proportional-integral-derivative (PID) modules 208, 210, 212 and 214, the airflow modules 216 and 218, a function module 220 and a map module 222. The PID modules 208, 210, 212 and 214 are programmed to receive a set point value, a process variable value, and an enable value and to perform closed loop control by changing their output to bring the process variable to the set point. The use of PID loops in controllers is discussed in U.S. Pat. No. 6,033,302, the contents of which are herein incorporated by reference. The source of the particular value is selected by configuring the configurable controller 112. That is, by selecting the logical connections between the output of other components of the configurable controller 112, and the inputs of the PID modules 208, 210, 212 and 214.

Accordingly, the enable value for the PID modules 208, 210, 212 and 214 may be provided from any of the digital values from the input components 184, from the network, or from any of the digital outputs discussed below. Alternatively, the enable value for the PID modules 208, 210, 212 and 214 may be provided directly from the Staefa RTS. As discussed below, the user may select the manner in which the enable function operates. In general, a user may program a module to be enabled when an input signal is present, or to be enabled when the input signal is not present. Thus, A particular PID module may be programmed to be enabled unless the configured input matches the programmed value. When a match occurs, the PID module is disabled, and the output of the PID module goes to a minimum value.

The process variable value for the PID modules 208, 210, 212 and 214 may be configured to be (i) the measured temperature as relayed from the Staefa RTS input module 194, the thermistor input modules 196 and 198, or the voltage input modules 200, 202, 204 and 206, (ii) the percentage inputs as relayed from the voltage input modules 200, 202, 204 and 206, (iii) any of the inputs to the network temperature input module 190 or the network percentage input module 192, or (iv) the output of the map module 222, the function module 220, or the air flow modules 216 and 218.

With the exception of the measured temperature as relayed from the Staefa RTS input module 194, any of the inputs for the process variable value may likewise be configured to be the set point value for the PID modules 208, 210, 212 and 214. Additionally, a set point value input to the Staefa RTS input module 194, the output of another PID module or a network configuration temperature or percentage value may be configured to be the set point.

The air flow modules 216 and 218 are programmed to receive an input value indicative of a differential pressure measurement and convert that input value to an airflow reading. The input value to air flow modules 216 and 218 can be configured to be a physical variable percentage from any of the voltage input modules 200, 202, 204 or 206 or a network variable percentage from the network percentage input module 192.

The function module 220 is programmed to calculate the minimum, maximum or average of up to four inputs. The inputs to the function module 220 may be configured to be the outputs of any of the input components 184 or the data processing components 186. Additionally, one input may be configured to receive a constant value from the network, either a percentage or a temperature.

The map module 222 is programmed to perform a linear interpolation with up to four breakpoints on an input signal. Thus, for a received signal having a value 25% of the way between two of the breakpoints, the output value is 25% of the way between the two outputs associated with the two breakpoints. The input data can be a network variable, a physical variable, or a PID module output. The input data in this embodiment reflects a temperature or a percentage value.

The output components 188 include the analog output modules 224, 226, and 228, the digital output modules 230, 232, 234, 236, 238, 240, 242 and 244, and the motor output modules 246, 248, 250 and 252. The analog output modules 224, 226, and 228 are programmed to receive an input signal indicative of a percent and produce a corresponding DC output signal between 0-10 volts DC. The input can be configured to be from any of the PID modules 208, 210, 212, or 214, the function module 220, a network variable input, a network configuration input or network percentage input. Additionally, any of the above inputs may be processed by the map module 22, with the output of the map module 22 being provided as an input to the analog output modules 224, 226, or 228. The analog output modules 224, 226, and 228 may also be configured to include a disable function such that when a network variable input, physical variable input, or another output component 188 equals the established disable function, the output of the analog output module 224, 226, or 228 goes to a minimum.

The digital output modules 230, 232, 234, 236, 238, 240, 242 and 244 are programmed to receive a percentage input and provide a 24 VAC, or Triac output signal (12 VA maximum). The input can be configured to be from any of the PID modules 208, 210, 212, or 214, the function module 220, a network variable input, a network configuration input or any of the motor output modules 246, 248, 250 or 252. The digital output modules 230, 232, 234, 236, 238, 240, 242 and 244 may also be configured to include a disable function such that when a network variable input, physical variable input, or another digital output component equals the established disable function, the output of the digital output module 230, 232, 234, 236, 238, 240, 242 and 244 goes to a minimum.

The motor output modules 246, 248, 250 and 252 are programmed to receive percentage inputs and generate a pair of digital output signals that may be used to control floating motors. The input an be configured to be from any of the PID modules 208, 210, 212, or 214, the function module 220, a network variable input, or a network configuration input. Additionally, any of the just identified inputs may be processed by the map module 22, with the output of the map module 22 being provided as an input to the motor output modules 246, 248, 250 or 252. The motor output modules 246, 248, 250 and 252 may also be configured to include a disable function such that when a network variable input, physical variable input, or the digital output modules 230, 232, 234, 236, 238, 240, 242 or 244 equals the established disable function, the output of the motor output modules 246, 248, 250 and 252 goes to a minimum.

Figure 2:
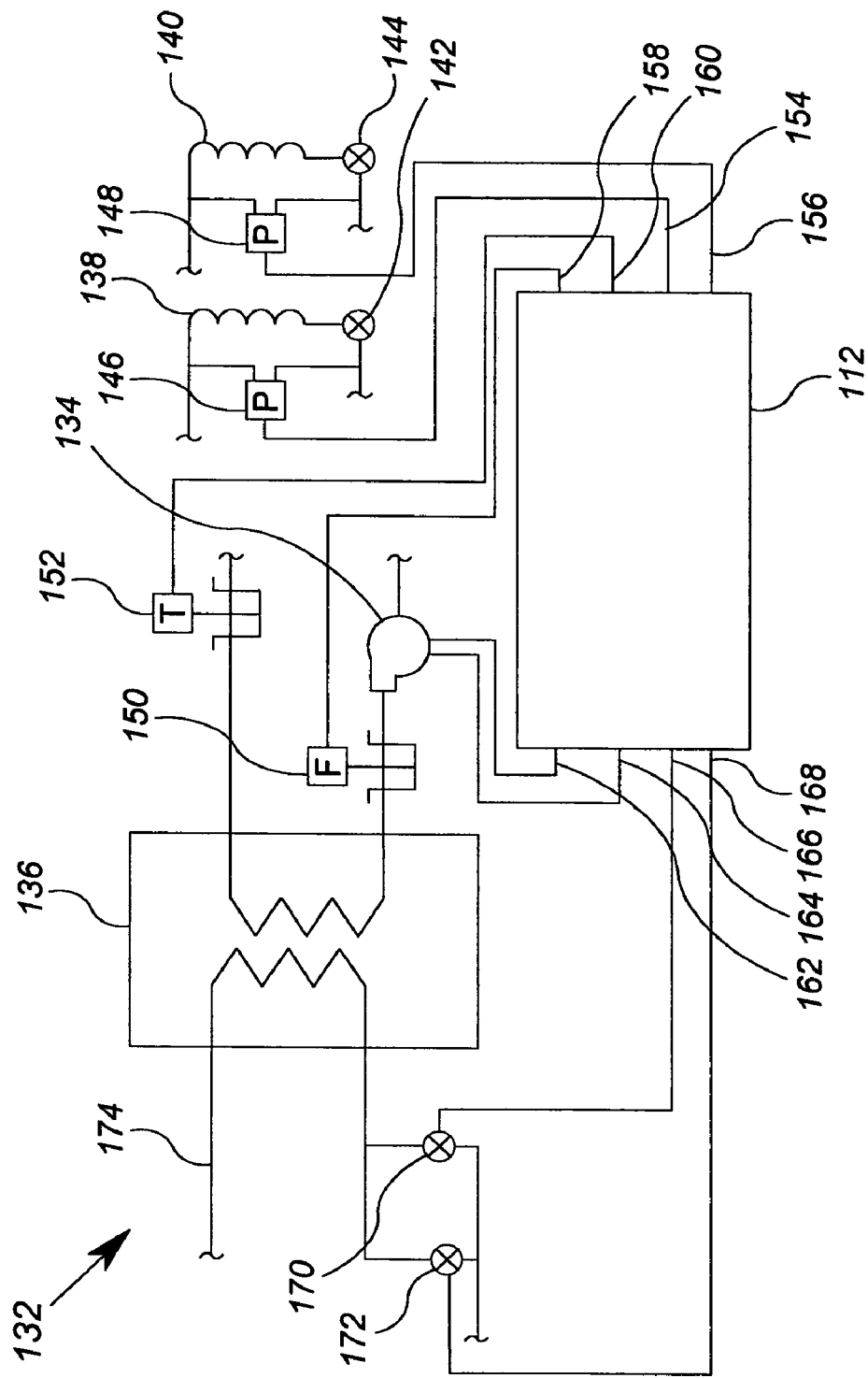
FIG. 2 shows a schematic diagram of a configurable controller in accordance with the present invention installed into a hot water converter system.
Figure 6:
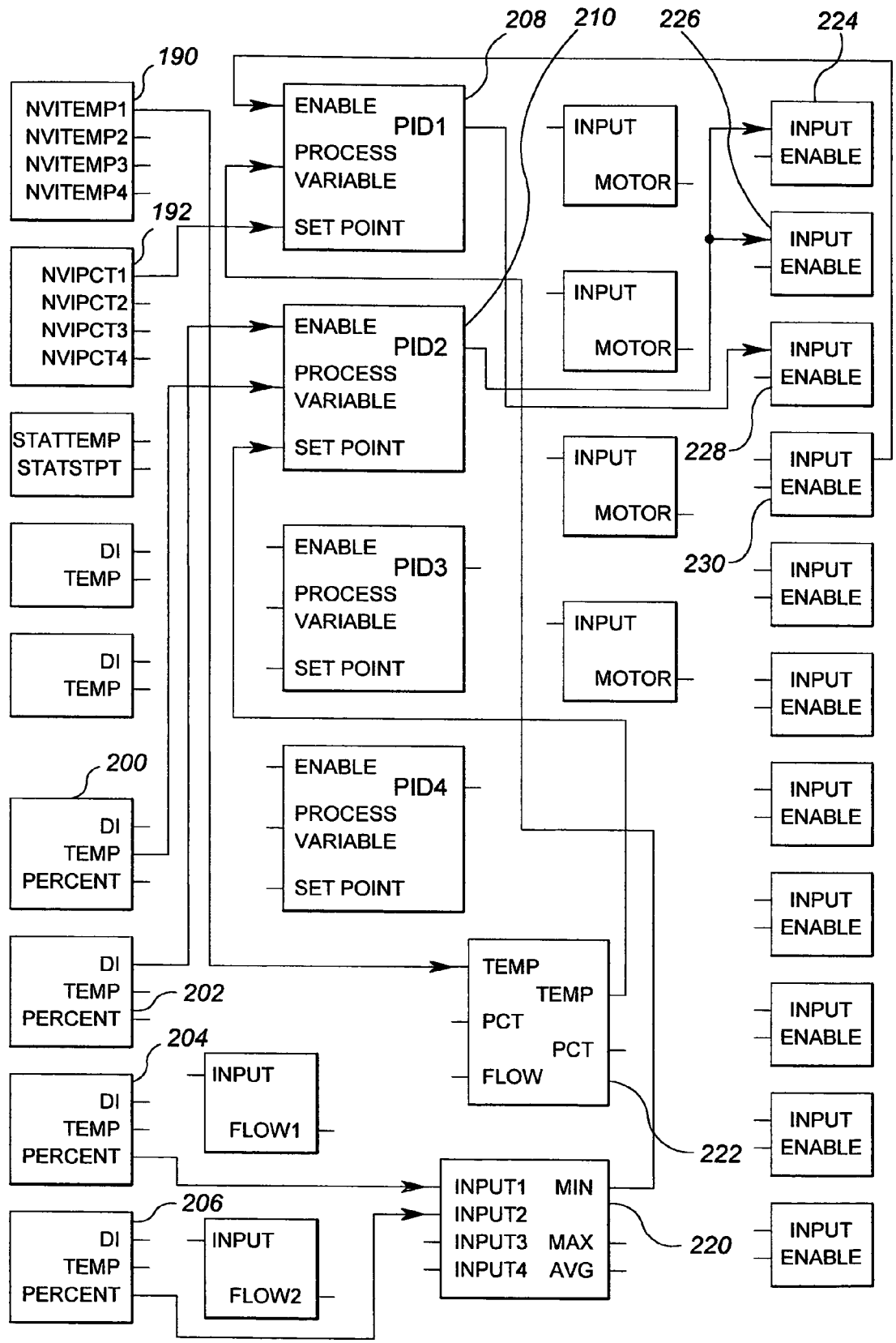
FIG. 6 shows the block diagram of FIG. 5 with logical connections for configuration of the configurable controller of FIG. 2 in the hot water converter system of FIG. 2.

FIG. 6 shows a block diagram of the pre-programmed components of the configurable controller 112 along with the logical connections that have been configured between the components to control the hot water converter system shown in FIG. 2. The operational concept of the hot water converter system 132 is described with reference to FIG. 1, FIG. 2 and FIG. 6. The basic operation of the hot water converter system 132 is to transfer heat from steam supplied by the steam supply header 174 to the secondary hot water supply through the heat exchanger 136. The heat energy is then transferred to the hot water loads 138 and 140. The configurable controller 112 is programmed to maintain a constant pressure and supply temperature in the secondary hot water supply, so that a consistent amount of heat energy is transferred to the hot water loads 138 and 140 for a given position of the control valves 142 and 144, respectively.

In operation, a need for hot water in a load such as the hot water load 138 or 140 is sensed by a device on the network 120, which issues a start command to the water pump 134. The network 120 also sends a network variable to the configurable controller 112 through the data network 128 indicating that the water pump 134 has been started. This network variable is passed to the digital output module 230, which sends an enable signal to the PID module 208, thus enabling the configurable controller 112 to control the speed of the hot water pump 134 through the output of output module 228.

The data network 128 also sends a network variable to the configurable controller 112 indicating the minimum pressure that is to be maintained in the secondary hot water supply. The minimum pressure network variable is received by the network percentage input module 192 which passes the network variable to the PID module 208 as a set point. In general, the speed of the water pump 134 controls the pressure in the system. Thus, as the speed of the water pump 134 increases, the pressure increases.

The configurable controller 112 also receives input from the pressure sensors 146 and 148 through the voltage input modules 204 and 206, respectively. The voltage input modules 204 and 206 convert the signals from the pressure sensors 146 and 148 into a percent pressure, and pass the data to the function module 220. The function module 220 compares the data from the two sensed pressures and passes the data indicating the minimum percent pressure sensed to the PID module 208 as a process variable. Based upon a comparison of the input process variable and the set point, the PID module 208 generates a signal to increase, decrease or maintain the speed of water pump 134 to the analog output module 228 which sends a speed control output signal to the water pump 134, thereby controlling the speed of the water pump 134 to maintain the secondary hot water system pressure at the set point established by the network 120.

Once the water pump 134 is running, there will be flow in the secondary hot water system which is sensed by the flow sensor 150. The flow signal is passed to the voltage input module 202 as a digital signal indicating that flow is present. The voltage input module passes the digital signal to the PID module 210 as an enable signal, enabling the configurable controller 112 to control the valve position of the low range steam valve 170 and the high range steam valve 172. The temperature set point for the secondary hot water system is passed as a network variable input from the data network 128 to the network temperature input module 190. The network variable is passed from the network temperature input module 190 to the map module 222 which generates an output based upon the value of the network variable. The output from the map module 222 is passed to the PID module 210 as the temperature set point for the secondary hot water system.

The temperature within the secondary hot water system is sensed by the temperature sensor 152, and a signal indicative of the sensed temperature is passed to the voltage input module 200 in the form of a current signal. The temperature signal is passed from the voltage input module 200 to the PID module 210 as a process variable. Based upon a comparison of the temperature set point received by the map module 222 and the sensed temperature input, the PID module 210 generates an output signal indicating whether more steam (heat), less steam, or an unaltered amount of steam is needed. The generated signal is passed to the analog output modules 224 and 226 which generate output signals to control the valve positions of the control valves 170 and 172, respectively. The system is programmed such that as more steam flow is needed, the low range steam valve 170 is opened. If the low range steam valve 170 is fully opened, then the high range steam valve 172 is controlled in the open direction.

The positioning of the low range steam valve 170 and the high range steam valve 172 controls the amount of steam that is allowed to flow through the heat exchanger 136, thus controlling the heat exchange with the secondary hot water supply to control the temperature of the secondary hot water supply to the set point commanded by the network 120.

Figure 7:
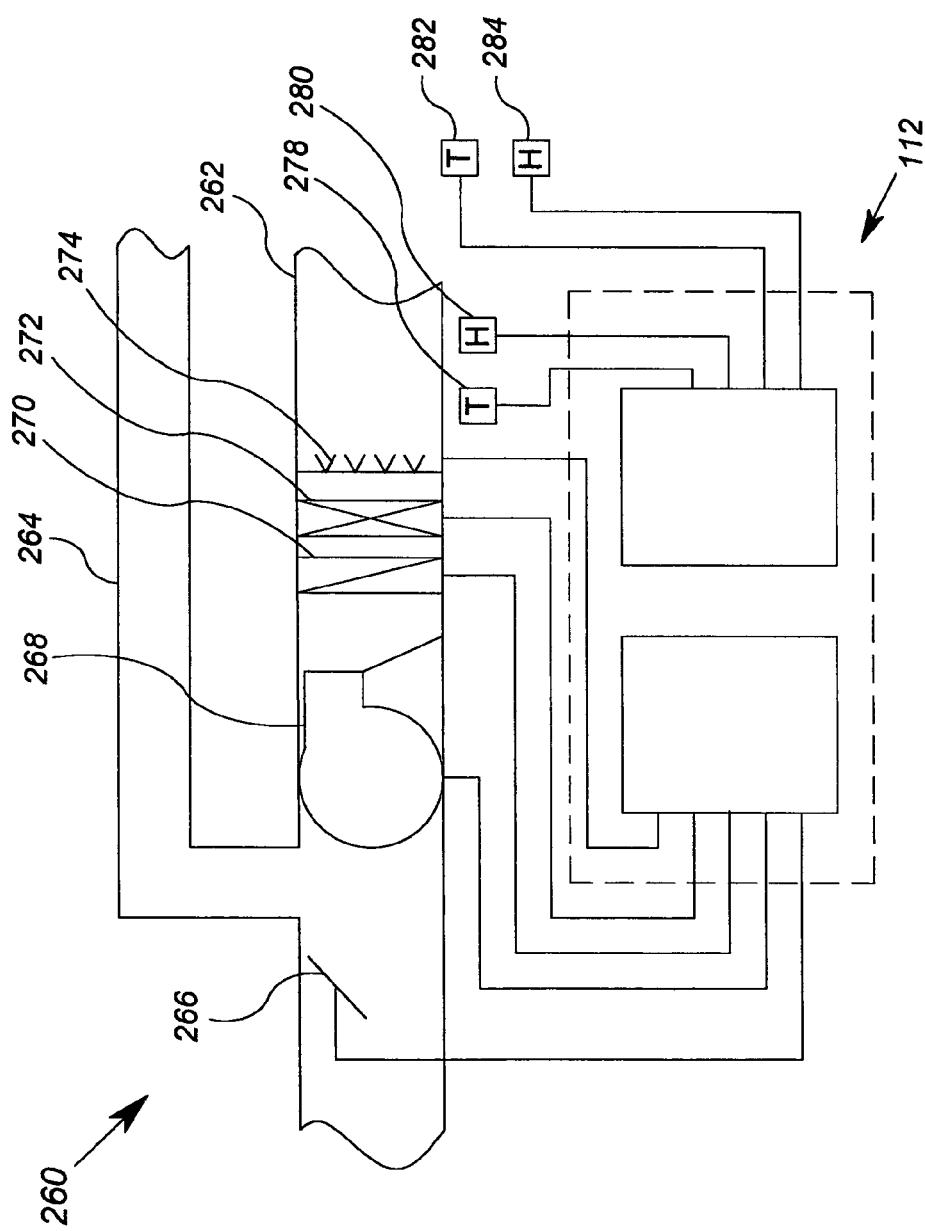
FIG. 7 shows a schematic diagram of a configurable controller in accordance with the present invention installed into a single zone temperature and humidity control system.

The configurable controller 112 may be configured to provide control in other applications. By way of example, but not of limitation, FIG. 7 shows the configurable controller 112 controlling a single zone air handler with a humidifier. The single zone system 260 includes the configurable controller 112, an air supply header 262, a return header 264, an outside air (OA) damper 266, a fan 268, a heater 270, a cooler 272 and a humidifier 274. The single zone system 260 also includes a variety of sensors including a supply header temperature sensor 278, a supply header humidity sensor 280, a zone temperature sensor 282 and a zone humidity sensor 284.

Figure 8:
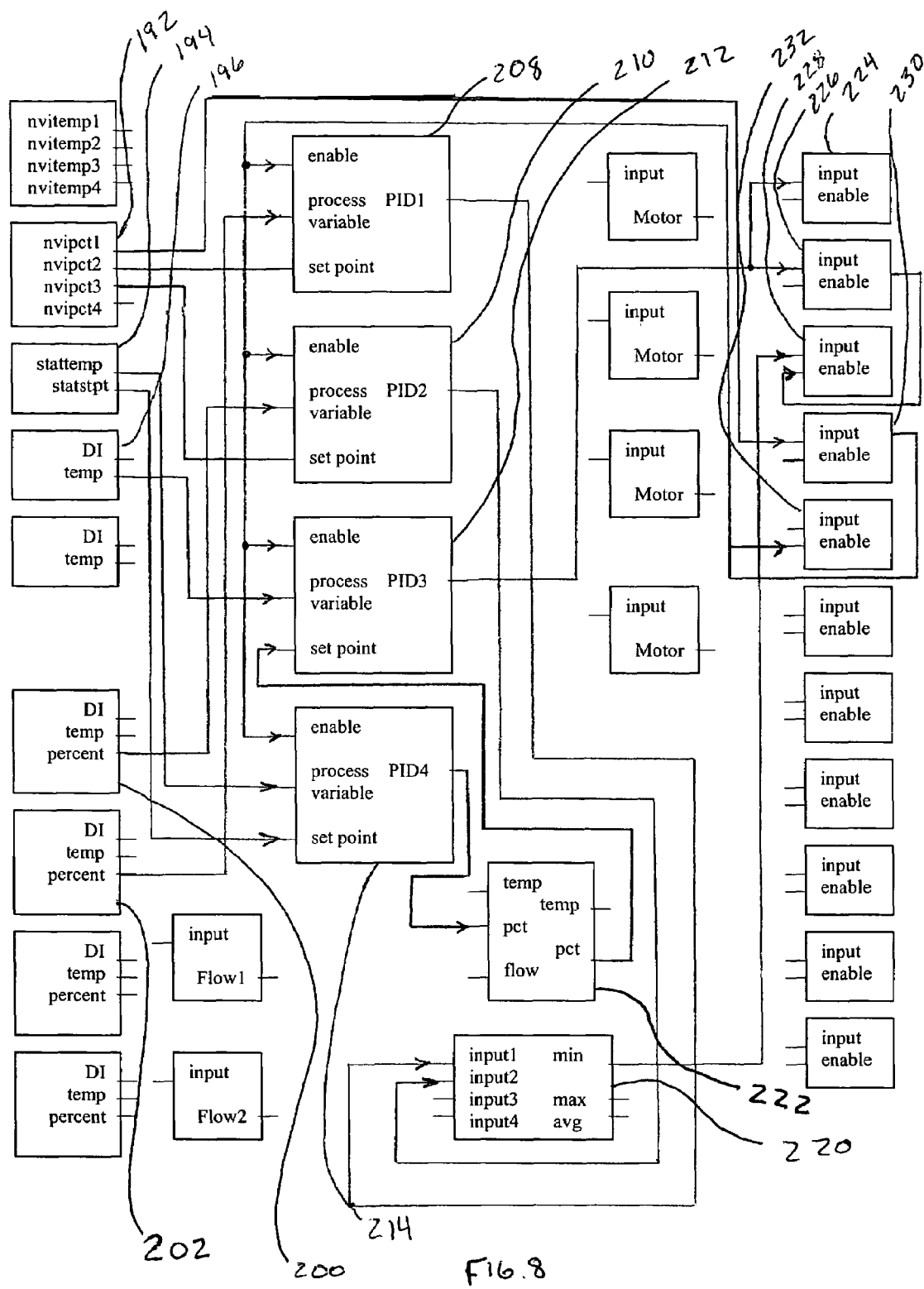
FIG. 8 shows a block diagram of the input, data processing, output components and the logical connections between those components for the configurable controller if FIG. 7.

FIG. 8 shows a block diagram of the pre-programmed components of the configurable controller 112 along with the logical connections that have been configured between the components to control the single zone system 260. The configuration and operation of the controller is described with reference to FIG. 1, FIG. 7, and FIG. 8. In general, the single zone system 260 is configured to maintain a zone at a specified temperature and humidity.

Operation of the single zone system 260 commences when the network 120 sends a network variable to the configurable controller 112 through the data network 128 to start the fan 268. The network variable is sent to the network percentage input module 192 and passed on to the digital output module 230. When the network variable is received, the digital output module 230 turns the fan 268 on. The output of the digital output module 230 is also passed as an enable input to the PID modules 208, 210, 212 and 214 and as an enable to the digital output module 232. When the output of the digital output module 230 is received by the digital output module 232, an output is generated by the digital output module 232 that opens the outside air damper 266. Accordingly, the fan 268 takes suction on the return header and the outside air, and provides air through the supply header 262 to the single zone.

The configurable controller 112 is configured to control temperature in this embodiment using the PID modules 212 and 214. In this embodiment, the zone temperature sensor 282 is a Staefa RTS. Accordingly, the Staefa RTS input module 194 is configured to receive input from the zone temperature sensor 282 set point slide as an input. The configurable controller 112 is configured to pass the set point slide input to the PID module 214 as a set point. The zone temperature sensor 282 further provides input to the Staefa RTS input module 194 indicative of the temperature in the room. The room temperature data is routed to the PID module 214 as a process variable. Because the PID module 214 also receives the enable input from the digital output module 230, the PID module 214 compares the input process variable to the set point to determine if either cooling or heating of the room is needed. The results of the comparison is output from the PID module 214 and routed to the map module 222. The output of the map module 22 is routed to the PID module 212 as a percent set point input.

The set point input to the PID module 212 is thus indicative of the temperature that the air being supplied to the room through the supply header 262 should be at in order to reach or maintain the room set point temperature as established by the Staefa RTS set point slide. The PID module 212 further receives an indication of the actual temperature of the air in the supply header as sensed by the supply header temperature sensor 278. This data is sent to the PID module 212 from the thermistor input module 196 as a process variable. Because the PID module 212 also receives the enable input from the digital output module 230, the PID module 212 compares the sensed temperature of the air in the supply header 262 to the set point to determine if either cooling or heating of the air in the supply header 262 is needed.

Accordingly, when the sensed temperature of the air in the supply header 262 is above the set point established through the PID module 214, the PID module 212 sends an output to the analog output module 224 indicating the extent to which a control valve (not shown) governing the flow of chill water to the cooler 272 should be further opened. In the event the control valve is opened too much, i.e. the air in the supply header 262 is at a temperature below the set point established by the PID module 214, then the analog output module 224 outputs a control signal that causes the control valve to move to a less fully opened position in response to the output of the PID module 212, allowing the air in the supply header 262 to be chilled less.

When the sensed temperature of the air in the supply header 262 is cooler than the set point established through the PID module 214, the PID module 212 sends an output to the analog output module 224 indicating the extent to which a control valve (not shown) that governs the flow of hot water to the heater 270 should be opened. When the sensed temperature of the air in the supply header 262 is warmer than the set point established by the PID module 214, then the analog output module 226 outputs a control signal that causes the valve to move to a less fully opened position in response to the output of the PID module 212, thus providing less heat to the air in the supply header 262.

As shown in FIG. 8, any control signal that is output from the PID module 212 is sent to both of the analog output modules 224 and 226. The analog output control modules 224 and 226 are configured such that a signal causing one of the two analog control modules 224 or 226 to position its associated control valve in an open position causes the other analog control module 226 or 224 to fully shut its associated control valve. Thus, air in the supply header 262 is either chilled or heated. Chilling and heating cannot both occur at the same time. However, the analog output modules 224 and 226 may both be shut at the same time. For example, when the mixed outside air and recirculated air in the supply header 262 is at the desired set point as provided to the PID module 212 from the output of the PID module 214, without any heating or chilling by the heater 270 or the cooler 272, both control valves will be controlled to the shut position. Additionally, when the PID modules 212 and/or 214 are not enabled, then both control valves will be controlled to the shut position.

In addition to controlling the position of the control valve that governs the flow of hot water to the heater 270, the output of the analog output module 226 is also provided to the analog output module 228 as an enable signal. Accordingly, any signal that is output from the analog output module 226 that positions the control valve in an open position further enables the analog output module 228 which in this embodiment is operatively connected to a control valve for the humidifier 274. Thus, whenever the air in the air supply header 262 is being heated, the humidity in the air in the air supply header 262 is controlled so as to achieve a desired humidity in the single zone being supplied with air from the air supply header 262.

The PID modules 208 and 210 in this embodiment are used to provide input to the analog output module 228. The PID module 208 receives a network variable from the data network 128 through the network percentage input module 192 that is used as a set point for the desired humidity in the zone. Data indicative of the actual humidity in the zone is passed from the zone humidity sensor 284 to the voltage input module 202 wherein the data is converted to a signal indicating the percent humidity in the zone. This signal is passed to the PID module 208 as a process variable. Because the PID module 208 is enabled by the output from the digital output module 230, the sensed humidity is compared to the set point humidity which, for purposes of this example, is 40%. Thus, if the sensed humidity is less than 40%, the PID module 208 will generate an output indicating a desired position for a control valve that governs the amount of water introduced into the air in the air supply header 262 from the humidifier 274. The configurable controller 112 is configured such that the output signal from the PID module 208 is passed to the function module 220 as an input.

The PID module 210 receives a network variable from the data network 128 through the network percentage input module 192 that is used as a set point for the maximum allowed humidity in the air supply header 262. Data indicative of the actual humidity in the air supply header 262 is passed from the supply header humidity sensor 280 to the voltage input module 200 wherein the data is converted to a signal indicating the percent humidity in the air supply header 262. This signal is passed to the PID module 210 as a process variable. Because the PID module 210 is enabled by the output from the digital output module 230, the sensed humidity is compared to the set point humidity which, for purposes of this example, is 80%. Thus, if the sensed humidity is less than 80%, the PID module 210 will generate an output indicating that the humidity control valve should be fully open. In the event the sensed humidity in the air supply header 262 is 80% or greater, then the PID module 210 will generate an output indicating that the humidity control valve should be fully shut. The configurable controller 112 is configured such that the output signal from the PID module 210 is passed to the function module 220 as an input.

The function module 220 is configured to provide as an output, the minimum value between the values received from the PID module 208 and the PID module 210. Accordingly, so long as the humidity in the air supply header 262 is below 80%, the value received from the PID module 208 will be either the same or less than the full open signal received from the PID module 210. Accordingly the signal output from the function module 220 will be the signal generated by the PID module 208 which is indicative of the needed humidity in the air being supplied to the zone in order to obtain or maintain the 40% humidity set point established by the network 120. However, if the humidity in the air supply header 262 reaches 80% or higher, then the output signal generated by the PID module 210 will be the minimum signal received by the function module 220, indicating that the humidity control valve should be fully shut.

The output signal from the function module 220 is passed to the analog output module 228, indicating the position to which the humidity control valve should be controlled. So long as heat is being supplied to the air in the air supply header 262 by the heater 270 as described above, the analog output module 228 will be enabled. Thus, the analog output module 228 uses the signal received from the function module 220 to generate an output signal that is used to control the humidity control valve position to the minimum position generated by the PID modules 208 and 210.

Figure 9:
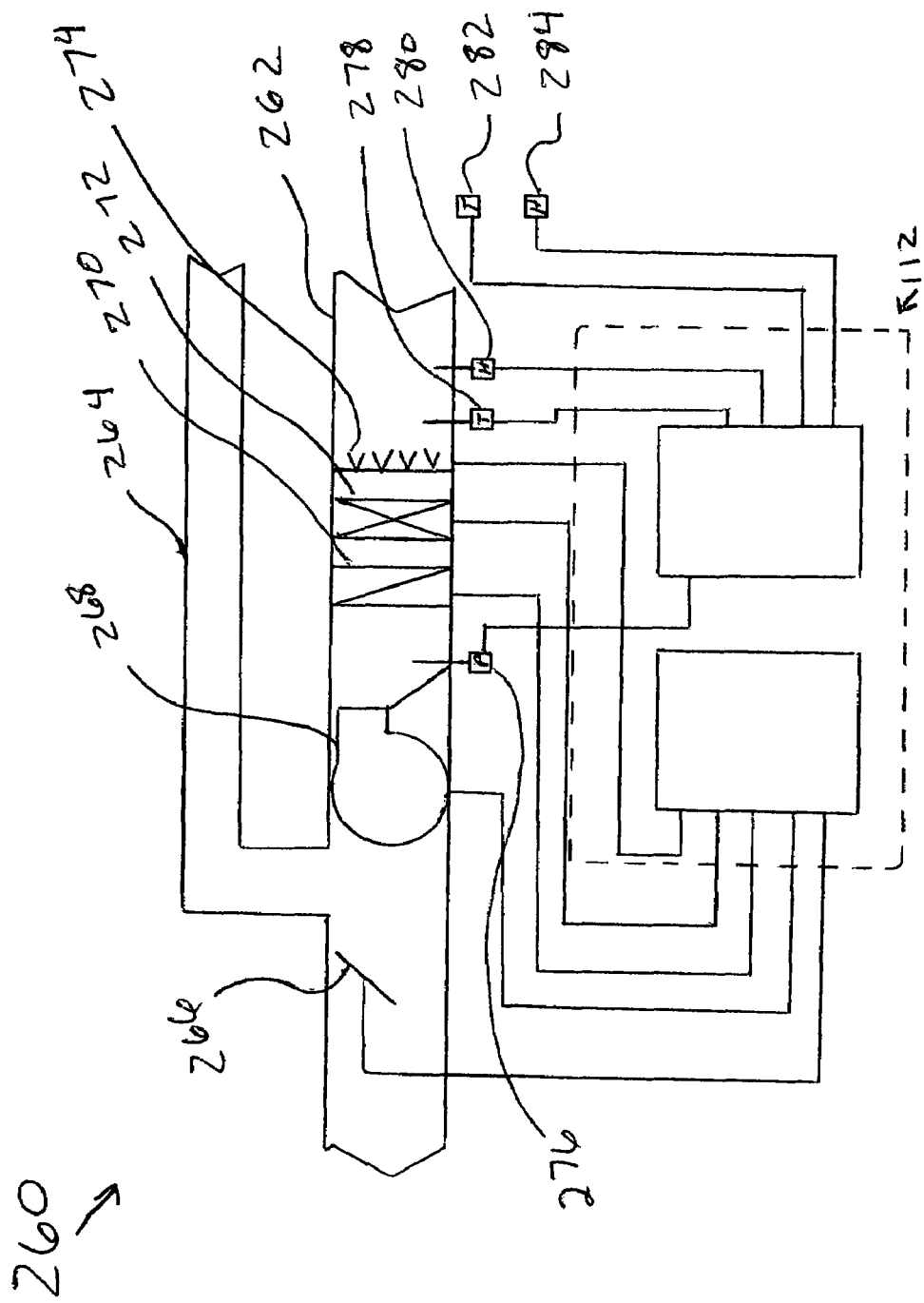
FIG. 9 shows the single zone temperature and humidity control system of FIG. 7 with a pressure sensor to provide positive indication when the fan is running.

In addition to allowing for use of a single controller in multiple applications, a configurable controller in accordance with the present invention is also easily modified as the system with which it is being used is changed. By way of example, but not of limitation, FIG. 9 shows the single zone system of FIG. 7. However, the single zone system has been upgraded to include a pressure sensor 276. Thus, a positive indication of the fan status is available. Accordingly, this positive indication of the fan status may be used to enable the control functions discussed above with reference to FIG. 1, FIG. 7 and FIG. 8.

Figure 10:
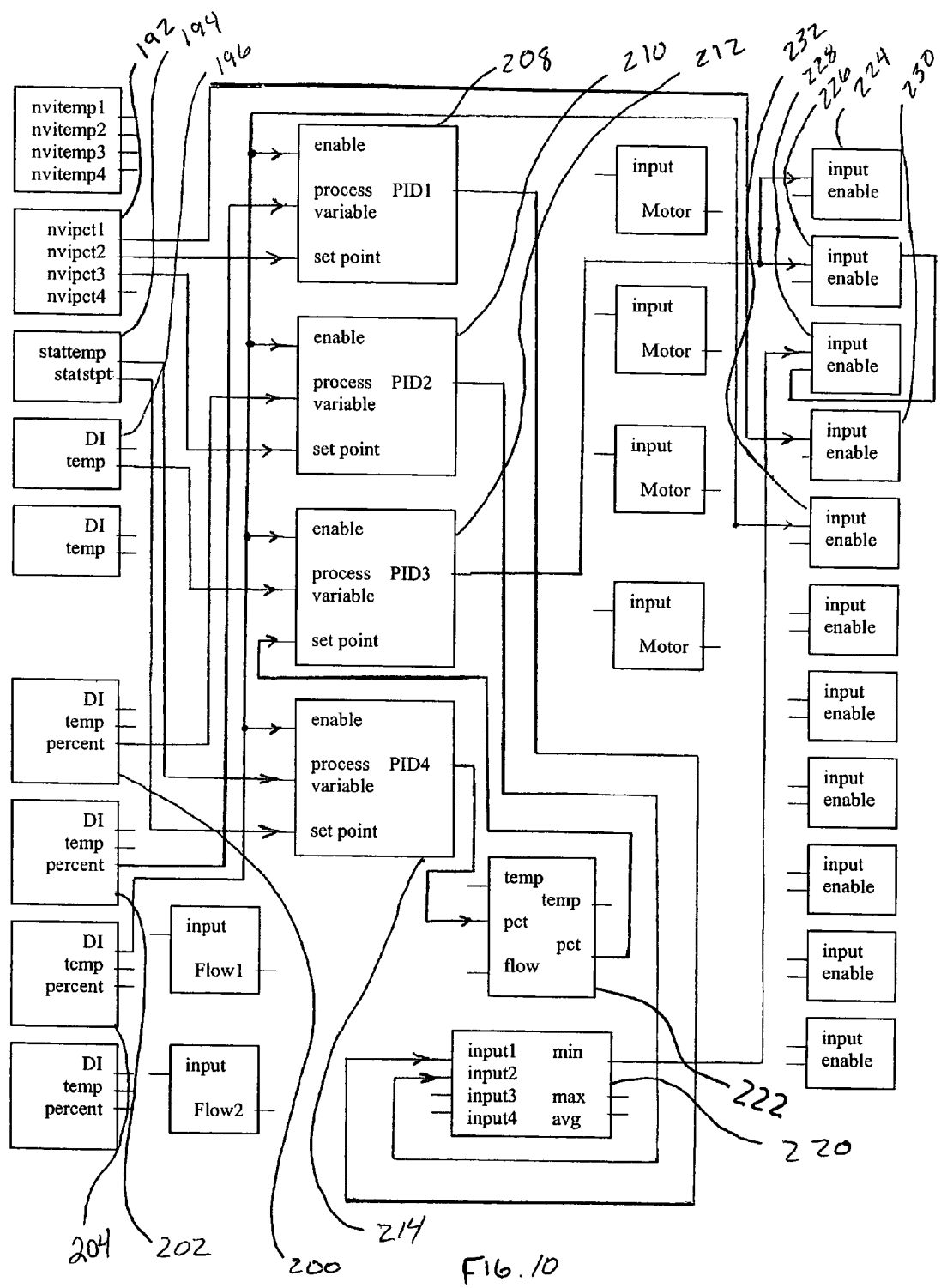
FIG. 10 shows the block diagram of FIG. 8 modified to use a signal from the pressure sensor of FIG. 9 to enable various components within a configurable controller embodying features of the present invention.

FIG. 10 shows a block diagram of the pre-programmed components of the configurable controller 112 along with the logical connections that have been configured between the components to control the single zone system 260 using the signal sensed by the pressure sensor 276. FIG. 10 is identical to FIG. 8, with the exception that the enable signal for the PID modules 208, 210, 212, and 214 and the digital output module 232 is provided from the output of the voltage input module 204 which is operatively connected to the pressure sensor 276. Thus, when the pressure sensor 276 senses a pressure that can only be achieved when the fan 268 is running, a signal is sent to the voltage input module 204 which operates as a switch, and generates an output that enables the PID modules 208, 210, 212, and 214 and the digital output module 232. Accordingly, temperature and humidity control by the configurable controller 112 is enabled only upon positive indication of the fan 268 running.

The configuration or reconfiguration of a controller in accordance with the principles of the present invention is preferably effected by use of a network tool such as TALON® Workstation Software commercially available from Siemens Building Technologies, Inc. of Buffalo Grove, Ill. In one embodiment of such a network tool, configuration properties are given names and are made up of elements for which the user is allowed to assign specific values. The names of the configuration properties in one embodiment are based upon a convention in which the first part of the name identifies the type of module with which the configuration property is identified includes, if needed, a numerical indicator identifying which of a plurality of similar modules the configuration property is associated with. Thus, a configuration property associated with a PID module may begin with the letters "PID" followed by a number (e.g. 1-4) identifying one of four PID modules. The configuration properties that may be used with the configurable controller 112 using such an approach is described below.

Configuration properties that are used for the PID modules 208, 210, 212 and 214 in this embodiment begin with the letters "PIDX". As discussed above, the "X" is a placeholder for the number of the PID being configured. Thus, since configurable controller 112 has four PID modules, the PID modules 208, 210, 212 and 214 are identified as number 1, 2 3 and 4, respectively. The configuration properties for the PID modules include "PIDXCfg", "PIDXCntr", "PIDXDisSrc", "PIDXPVSrc", and "PIDXSPSrc".

The "PIDXCfg" configuration property includes the elements "reverse", "unit", "outMinPct", "outmaxPct", "tempDBand", "pctDBand" and "bias". The "reverse" element can have values of "true" or "false". If the value is "true", then the PID will subtract the received set point from the received process variable in determining an error. If the value is "false", then the PID will subtract the received process variable from the received set point in determining the error.

The "unit" element selects the units (temperature or percentage) which will be used for the PID proportional gain, set point offset, and dead band. The "outMinPct" and "outMaxPct" elements are used to identify the minimum and maximum percentage values that may be output by the PID module. The "tempDBand" and "pctDBand" establish the temperature and percentage dead bands that will be used by the PID. In other words, if the error determined by the PID is less than the value selected for these elements, then the PID output will not change. In this embodiment, these values may be selected from values between −163.84% and 163.83%. The "bias" element is used when the PID is in proportional only control (i.e., when the elements "Ti" and "Td" discussed below are set to zero). The "bias" element is used to establish the PID output when the received process variable is equal to the received set point.

The controller gain for the PID modules is established using the "PIDXCntr" configuration property. The elements in the "PIDXCntr" configuration property include "krPct", "krTemp", "ti" and "td". The "krPct" element defines the gain in percent per percent for the PID. The value of the "krPct" element may be set in this embodiment between 0% per % to 163.83% per %. The "krTemp" element indicates the temperature gain in percent per degree and may be selected from a value between 0.00 to 91.02% per degree Fahrenheit (0.00 to 163.83% per degree Celsius). The "ti" element is the time in seconds that is used for integral actions and may be selected from a value between 0.0 and 6553.4 seconds. The "td" element is the time in seconds that is used for derivative actions and may be selected from a value between 0.0 and 6553.4 seconds. For both "ti" and "td", a value of "0.00" indicates no action is to be taken. If a PID module is not performing any integration or derivative functions, then it is said to be operating in a proportional only mode.

The "PIDXDisSrc" configuration property is used to select the source of the disable function for the PID module. If there is no disable function source, then the PID is always enabled. The "PIDXDisSrc" configuration property includes a "type" element and a "value" element. The "type" element selects the source of the disable signal and may be selected to be a bypass input, such as from a Staefa RTS, any of the digital inputs or outputs, or a network variable. The "value" element identifies the value that the disable source must be to disable the PID. The value is either true ("1") or false ("0"). Accordingly, setting a "true" value configures the PID module to be disabled if the signal received from the source is true, while a false value configures the PID module to be enabled if the signal received from the source is false.

The "PIDXPVSrc" configuration property selects the source of the PID process variable and must be in the same units as the "PIDXSPSrc" configuration property discussed below. The "PIDXPVSrc" configuration property includes a "sourceType" element and a "sourceNum" element. The "sourceType" element selects the input variable type. The input variable type may be the Staefa RTS temperature, a process variable temperature, a process variable percentage, a network variable temperature, a network variable percentage, or the output from the function module, the map module or either of the airflow modules. The "sourceNum" element selects the input variable number. For example, a process variable temperature may be supplied from either of the thermistor input modules 196 or 198, or any of the voltage input modules 200, 202, 204, and 206. Thus, these sources are numbered 1-6, respectively, so as to identify which specific module is being selected.

The "PIDXSPSrc" configuration property is used to select the source and properties for the PID set point. The elements in the "PIDXSPSrc" configuration property include "sourceType", "sourceNum", "nciTemp", "nciPct", "tempOffset", and "pctOffset". The "sourceType" and "sourceNum" elements are used in the same manner as the elements of the same name discussed above with respect to the "PIDXPVSrc" configuration property. The input set point type may be the Staefa RTS set point (slider bar), a process variable temperature, a process variable percentage, a network variable temperature, a network variable percentage, or the output from the function module, the map module, either of the airflow modules or another PID module (i.e. cascaded). Additionally, the set point source may be a network configuration input. In this instance, either the "nciTemp" or "nciPct" element, as appropriate, is used to select the network configuration input. The "tempOffset" element is the number that will be added to the set point if the PID is configured for temperature inputs. The "pctOffset" element is the number that will be added to the set point if the PID is configured for percentage inputs.

The "TempStptLim" configuration property is used to establish the limits for a value read from a space temperature set point slide. The elements for the "TempStptLim" configuration property are "minTemp" and "maxTemp". The "minTemp" element establishes the minimum value that will be accepted from the space temperature set point slide which in this embodiment may be selected to be a value between 50.0 and 95.0 degrees Fahrenheit (10.00 to 35.00 degrees Celsius). The "maxTemp" element establishes the maximum value that will be accepted from the space temperature set point slide which in this embodiment may be selected to be a value between 50.0 and 95.0 degrees Fahrenheit (10.00 to 35.00 degrees Celsius).

The configuration properties for the airflow modules 216 and 218 begin with the letters "FlowX" and include "FlowXCfg" and "FlowXSrc". The elements for the "FlowXCfg" configuration property, which configures the flow module, include "ductArea", "maxVelocity", "flowNom", "flowGain", and "prOffset". The "ductArea" element sets the cross sectional airflow area of the duct and can be set to a value from 0.0000 to 5.3820 square feet (0.0000 to 0.5000 square meters). The "maxVelocity" element identifies the air velocity that corresponds to the maximum reading of a differential pressure sensor that is providing input to the airflow module 216 or 218 and can be set to a value from 0 to 65.535 meters per second. The "flowNom" element is a value that is used to convert the measured flow into a percentage. Specifically, the measured flow reading is divided by this element to provide a percentage. The "flowNom" element can be selected to be a value from 0 to 65,534 liters per second, and the same value should be used for both air flow modules when the values are being used by the function module 220 or the map module 222.

The "flowGain" element is used to calibrate the air-flow reading when balancing VAV terminals. The calculated air flow is multiplied by this value to determine the corrected air flow. The "flowGain" element may be set at a value from 0.000 to 2.000. The "prOffset" element is the percentage offset used to calibrate flow readings that are calculated in percentages and is subtracted from the differential pressure reading and can be set at a value from −10.00% to 10%.

The "FlowXSrc" configuration property selects the source of the pressure reading input and includes a "sourceType" element and a "sourceNum" element. The "sourceType" element selects the input variable type. The "sourceNum" element identifies the input number ("0-6") which can be from either the network percent input module 192 or the voltage input modules 200, 202, 204 and 206 (3-6 respectively).

The function module 220 is configured using a "Fnc1Cfg" configuration property, a "Fnc1ConstA" configuration property and a "Fnc1Src" configuration property. The elements for the "Fnc1Cfg" configuration property include "functionType" and "numInputs". The "functionType" element identifies the type of function that will be performed. The available functions include determining the minimum, the maximum, and the average value input. These functions are identified by the values "0", "1", and "2", respectively. The "numInputs" element identifies the number of inputs, from 2-4, that the function module 220 will analyze.

The "Fnc1ConstA" configuration property is used to select an input constant that is used in the function component calculation and includes a "temperature" element and a "percent" element. The "temperature" element provides a constant value for calculations of temperatures and can be set at a number from −459.706 degrees Fahrenheit to 621.788 degrees Fahrenheit (−273.17 degrees Celsius to 327.66 degrees Celsius). The "percent" element provides a constant value for calculations of percentages and can be set at a number from −163.84% to 163.83%.

The "Fnc1Src" configuration property selects the input types and sources for the function module 220 and includes eight elements, "sourceTypeA" through "sourceType D" and "sourceNumA" through "sourceNumD" The "sourceType" elements select the input variable type and the "sourceNum" elements identify the input variable number ("0-6", with "0" indicating no input) which can be from the thermistor input modules 196 and 198 or the voltage input modules 200, 202, 204 and 206 (1-6 respectively), the PID modules 208, 210, 212 and 214, the air flow module 218, the network percentage input module 192 or the network temperature input module 190.

The map module 222 is configured using a "MapBrkin" configuration property, a "MapBrkOut" configuration property, a "MapCfg" configuration property, and a "MapSrc"

configuration property. The "MapBrkIn" configuration property is used to identify the input temperature and percentage breakpoints. That is, the specific temperatures or percentages at which the value output by the map module 222 will change. The elements for the "MapBrkIn" configuration property are "tempA" through "tempD" and "pctA" through "pctD". The "tempA" through "tempD" elements may be set at values from −459.706 degrees Fahrenheit to 621.788 degrees Fahrenheit (−273.17 degrees Celsius to 327.66 degrees Celsius). The "pctA" through "pctD elements may be set at values from −163.84% to 163.83%. The breakpoints are read by the system consecutively. Thus, when three breakpoints are desired, the "A", "B" and "C" elements must be used and are entered in ascending order.

The "MapBrkOut" configuration property is used to identify the output temperature and percentage breakpoints. That is, the output value associated with inputs above or below the input breakpoints. The elements for the "MapBrkOut" configuration property are "tempA" through "tempD" and "pctA" through "pctD". The "tempA" through "tempD" elements may be set at values from −459.706 degrees Fahrenheit to 621.788 degrees Fahrenheit (−273.17 degrees Celsius to 327.66 degrees Celsius). The "pctA" through "pctD elements may be set at values from −163.84% to 163.83%. The breakpoints are read by the system consecutively. Thus, when three breakpoints are desired, the "A", "B" and "C" elements must be used.

The "Map1Cfg" configuration property selects the number of breakpoints and the input and output type for the map module 222. The elements for the "Map1Cfg" configuration property are "numInputs", "inType", and "outType". The "numInputs" element selects the number of breakpoints in the input range and can be set at a value of 2 to 4. The "inType" element identifies the units of the input as a temperature ("0"), a percentage ("1") or a flow ("2"). The "outType" element identifies the units of the output as a temperature ("0") or a percentage ("1").

The "Map1Src" configuration property selects the input source for the map module 222. The elements for the "Map1Src" configuration property are "sourceType" and "sourceNum". The "sourceType" element selects the input variable type and the "sourceNum" element identifies the input variable number ("0-6", with "0" indicating no input) which can be from either of the thermistor input modules 196 and 198 or the voltage input modules 200, 202, 204 and 206 (1-6 respectively).

The motor output modules 246, 248, 250 and 252 are configured using a "MtrX" configuration property, a "MtrXDisSrc" configuration property, a "MtrXLim" configuration property, and a "MtrXSrc" configuration property. The "MtrX" configuration property configures the three position floating motor output using a "travelTime" element and a "reverse" element. The "travelTime" element sets the run time of the motor and can be selected to be from 30 to 600 seconds. The "reverse" element determines whether or not the motor outputs should be reversed and can be set as false ("0") or true ("1").

The "MtrXDisSrc" configuration property sets the disable function for the digital output of the motor output modules 246, 248, 250 and 252. Thus, if the source value is equal to the disable value, the motor output module 246, 248, 250 or 252 is disabled. The elements for the "MtrXDisSrc" configuration property are "type" and "value". The "type" element is used to select the disable source and the "value" element selects the disable value which may be false ("0"), or true ("1").

The "MtrXLim" configuration property sets the minimum and maximum output range of the motor output modules 246, 248, 250 and 252 as a percentage. The elements for the "MtrXLim" configuration property are "minPercent" and "maxPercent". The "minPercent" element sets the minimum input value and the "maxPercent" element sets the maximum input value. Both elements may be set at values from −163.84% to 163.83%.

The "MtrXSrc" configuration property sets the input source for the motor output modules 246, 248, 250 and 252 and includes a "sourceType" element, a "sourceNum" element and a "nciPct" element. The "sourceType" element selects the input variable type and the "sourceNum" element identifies the input variable number ("0-6", with "0" indicating no input). The "nciPct" element is used when NCI_PCT (network constant percentage) is selected as the source and selects the percentage value to be used as an input variable constant. The value of the "nciPct" element can be a value selected to be from −163.84% to 163.83%.

The analog output modules 224, 226 and 228 are configured using an "AOXDisSrc" configuration property, an "AOXInRange" configuration property, an "AOXOutRange" configuration property, and an "AOXSrc" configuration property. The "AOXDisSrc" configuration property sets the disable function for the analog output modules 224, 226 and 228. The elements of the "AOXDisSrc" configuration property include "type", "value", and "enableDelay". The "type" element is used to select the disable input source and the "value" element selects the disable value which may be false ("0"), or true ("1"). The "enableDelay" element selects the duration of the delay the system will wait after a disable condition clears before the delay is released and can be selected to be a value from 0 to 6553.4 seconds. Thus, if the source value is equal to the disable value, the output of the analog output module 224, 226 or 228 is disabled. Once the disable condition is no longer true, then the disable is released after the delay time specified.

The "AOXInRange" configuration property is used to define the input percentage range for the analog output modules 224, 226 and 228. The elements in the "AOXInRange" configuration property are "minPercent" and "maxPercent". The "minPercent" element sets the minimum input value and the "maxPercent" element sets the maximum input value. Both elements may be set at values from −163.84% to 163.83%.

The "AOXOutRange" configuration property is used to define the output percentage range for the analog output modules 224, 226 and 228. The elements in the "AOXOutRange" configuration property are "minPercent" and "maxPercent". The "minPercent" element sets the minimum output value and the "maxPercent" element sets the maximum output value. Both elements may be set at a value from −163.84% to 163.83%.

The "AOXSrc" configuration property sets the input source for the analog output modules 224, 226 and 228 and includes a "sourceType" element, a "sourceNum" element and a "nciPct" element. The "sourceType" element selects the input variable type and the "sourceNum" element identifies the input variable number ("0-6", with "0" indicating no input). The "nciPct" element is used when NCI_PCT is selected as the source and selects the percentage value to be used as an input variable constant. The value of the "nciPct" element can be a value selected to be from −163.84% to 163.83%.

The digital output modules 230, 232, 234, 236, 238, 240, 242 and 244 are configured using a "DOXCfg" configuration property, a "DOXDisSrc" configuration property, and a "DOXSrc" configuration property. The "DOXCfg" configuration property is used to configure the digital output modules 230, 232, 234, 236, 238, 240, 242 and 244 to operate as a dead band output or a pulse width modulated (PWM) output. The elements in the "DOXCfg" configuration property include "type", "pWMMinPct", pWMMaxPct", "dBandPctOn", "dBandPctOff", and "pWMCycleTime". The "type" element selects the manner in which the digital output module will use the input and can be set to dead band operation ("0") or PWM ("1"). The "pWMMinPct" element defines the input needed for a 0% duty cycle and may be selected to be a value from −163.84% to 163.83%. The "pWMMaxPct" element defines the input needed for a 100% duty cycle and may be selected to be a value from −163.84% to 163.83%. The "dBandPctOn" element defines the on values for a dead band output and may be selected to be a value from −163.84% to 163.83%. The "dBandPctOff" element defines the off values for a dead band output and may be selected to be a value from −163.84% to 163.83%. The "pWMCycleTime" element defines the total cycle time for the digital output module during a PWM cycle, thus including both "on" and "off" times for a single cycle. The "pWMCycleTime" element may be set to a value from 0.0 to 6553.4 seconds.

The "DOXDisSrc" configuration property sets the disable function for the digital output modules 230, 232, 234, 236, 238, 240, 242 and 244. The elements of the "DOXDisSrc" configuration property include "type", "value", and "enableDelay". The "type" element is used to select the disable input source and the "value" element selects the disable value which may be false ("0"), or true ("1"). The "enableDelay" element selects the duration of the delay the system will wait after a disable condition clears before the delay is released and can be selected to be a value from 0 to 6553.4 seconds. Thus, if the source value is equal to the disable value, the output of the digital output module 230, 232, 234, 236, 238, 240, 242 or 244 is disabled. Once the disable condition is no longer true, then the disable is released after the delay time specified.

The "DOXSrc" configuration property sets the input source for the digital output modules 230, 232, 234, 236, 238, 240, 242 and 244 and includes a "sourceType" element, a "sourceNum" element and a "nciPct" element. The "sourceType" element selects the input variable type and the "sourceNum" element identifies the input variable number ("0-6", with "0" indicating no input). The "nciPct" element is used when NCI_PCT is selected as the source and selects the percentage value to be used as an input variable constant. The value of the "nciPct" element can be a value selected to be from −163.84% to 163.83%.

The network temperature input module 190 and the network percentage input module 192 can be configured to have an input fail value to be used when no input is received from the network. This value is set using the "NvFailVal" configuration property which includes "temp 1" through "temp4" elements and "pct 1" through "pct4" elements. The "temp1" through "temp4" elements correspond to the four inputs to the network temperature input module 190 and can be set at a value from −459.706 degrees Fahrenheit to 621.788 degrees Fahrenheit (−273.17 degrees Celsius to 327.66 degrees Celsius). The "pct1" through "pct4" elements correspond to the four inputs to the network percentage input module 192 and can be set at a value from −163.84 percent to 163.83%.

The thermistor input modules 196 and 198 and the voltage input modules 200, 202, 204 and 206 (1-6 respectively) can be configured to filter incoming data over a period of time using a "InFilTime" configuration property. The "InFilTime" configuration property includes elements "tFilter1" through "tFilter6", corresponding to the input modules 196 and 198 and the voltage input modules 200, 202, 204 and 206, respectively, and can be set for any time from 0 to 6553.4 seconds.

The amount of time that the configurable controller 112 will remain in bypass mode once a bypass signal is received by the configurable controller 112 is configured using the "BypassTime" configuration property which accepts a value from 0 minutes to 540 minutes.

Figure 11:
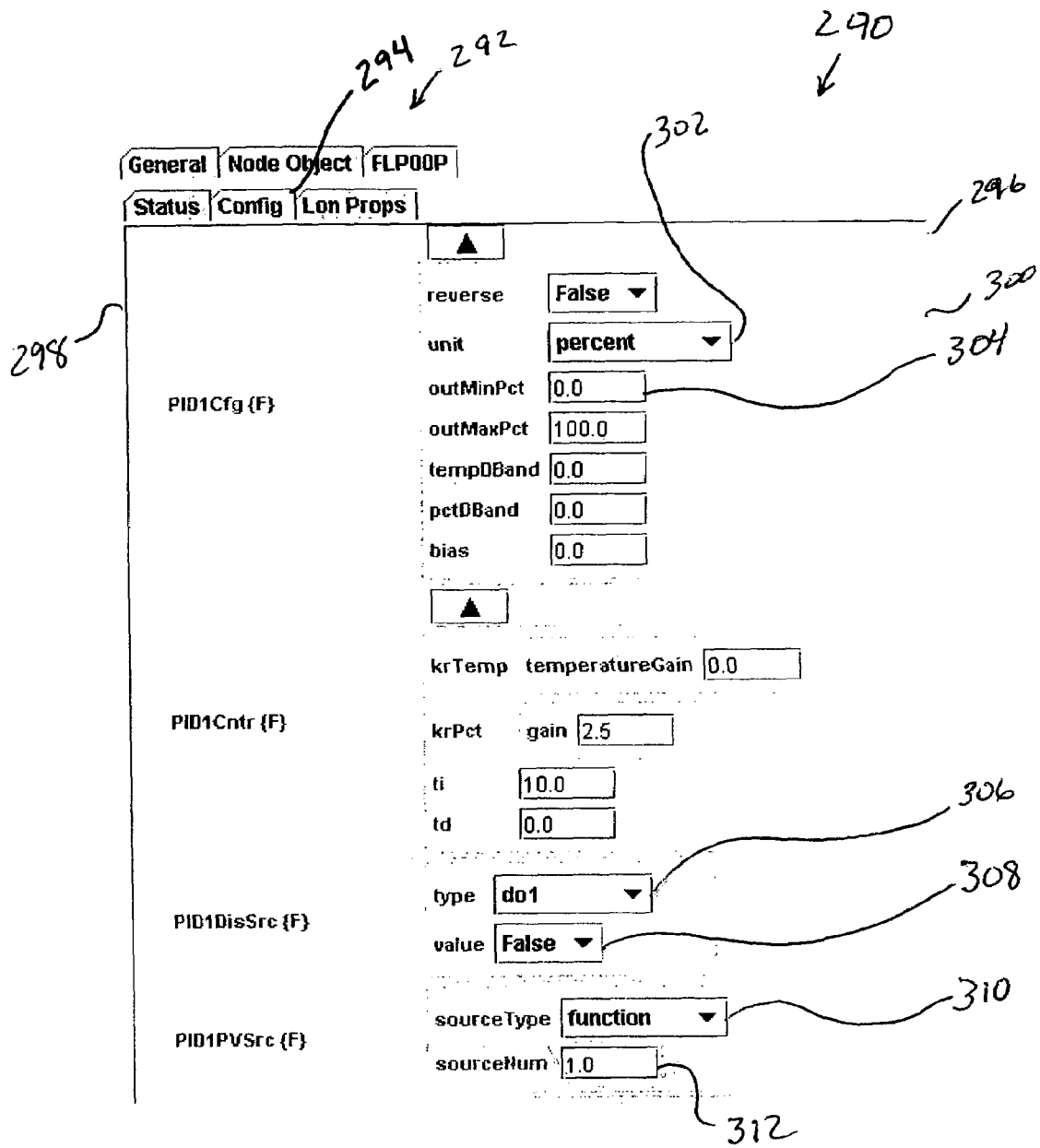
FIG. 11A-I show screen shots of a user interface that may be used in accordance with the present invention to configure a configurable controller.
Figure 11:
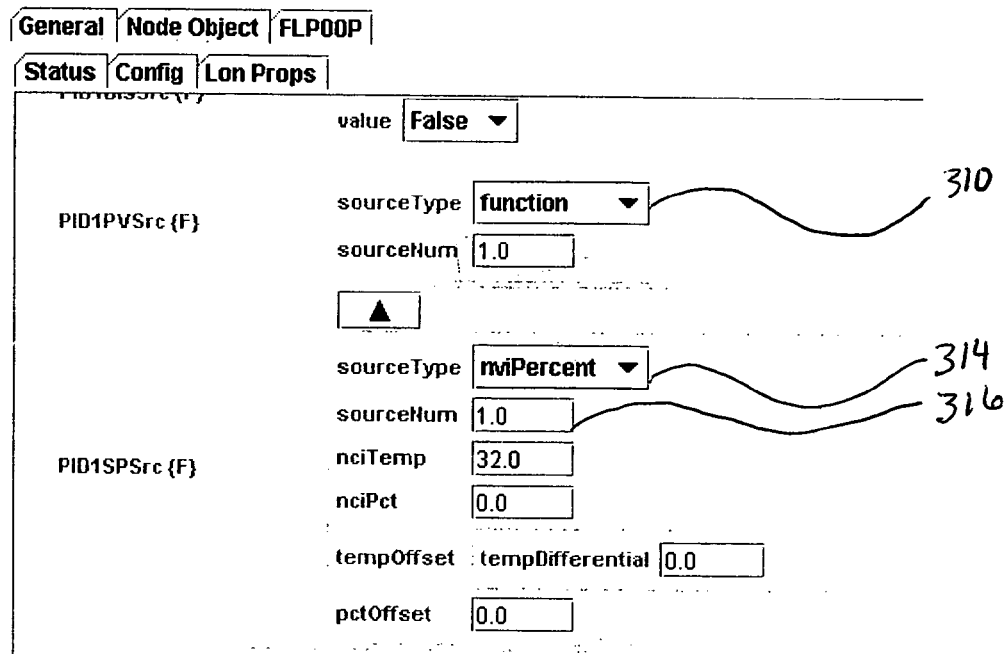
Figure 11:
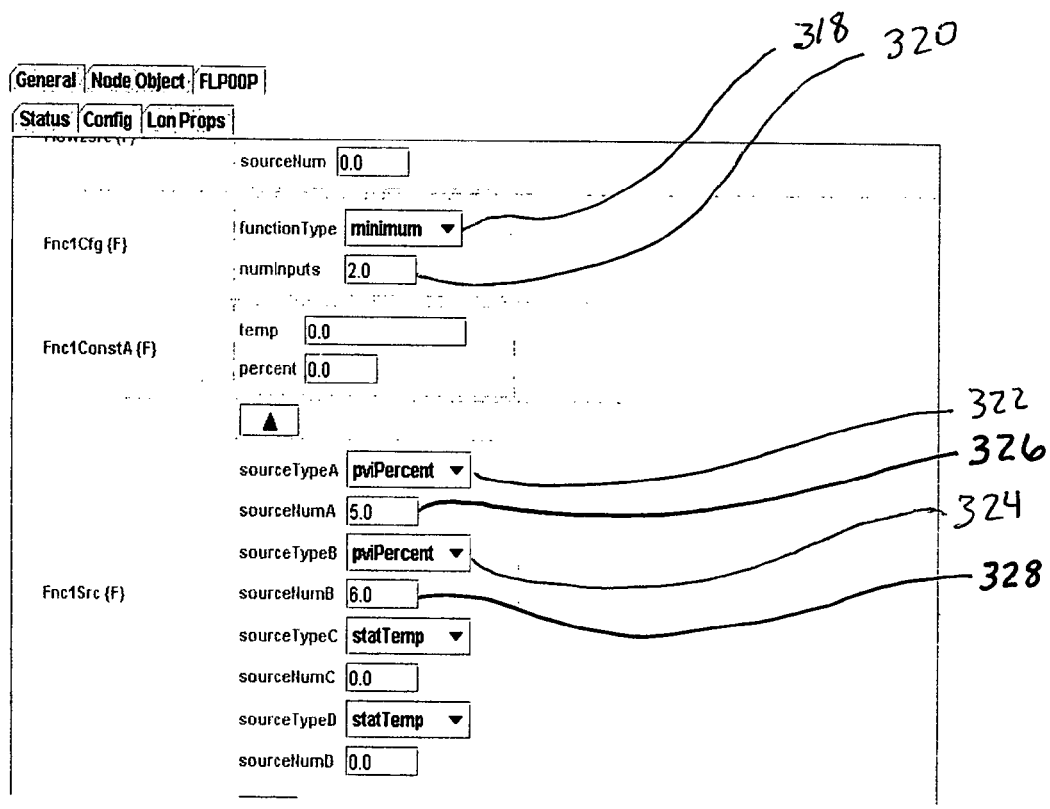
Figure 11:
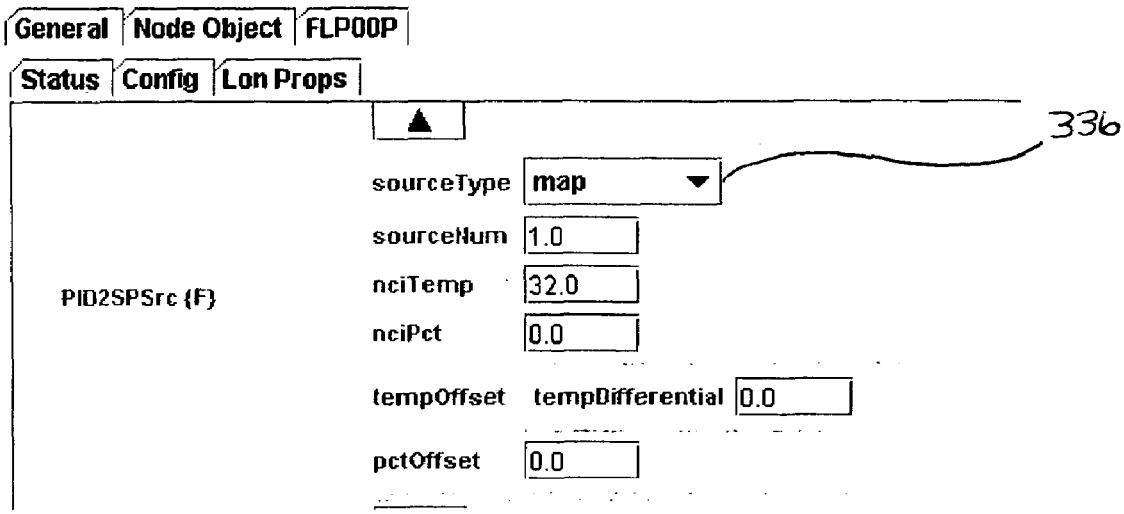
Figure 11:
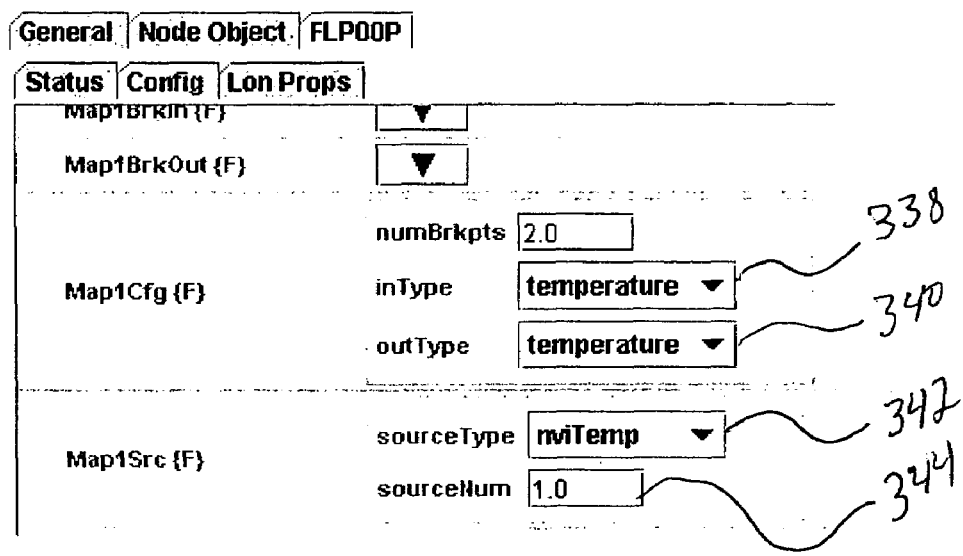

One embodiment of a user interface provided with a tool that uses configuration properties and elements is shown in FIGS. 11A-11I. Referring to FIG. 11A, the user interface includes a window 290 with a plurality of navigational tabs 292. Selection of configuration tab 294 results in the display of a page 296 that includes a configuration property column 298 and an element column 300.

All of the configuration properties that may be modified within the configurable controller to be configured are listed within the configuration property column 298. A user scrolls the page 296 through the positions illustrated in FIG. 11A-I to observe the various configuration properties. The element column 300 is used to identify input sources and values used within the system. The user is allowed to select the input source and values by using pull down tabs such as pull down tab 302 and editable fields such as editable field 304. The selection of using a pull down tab or an editable field for a particular element is a design choice.

The embodiment of a user interface shown in FIGS. 11A-I represents the configuration of configurable controller 112 for use in the hot water converter system discussed above with reference to FIGS. 1, 2 and 6. Accordingly, the PID module 208 is set to process values representing percentages which is shown by the "percent" value in pull down tab 302.

The disable source for the PID module 208 is identified by the name "PID1DisSrc {F}". The disable input source for the PID module 208 is selected by the "type" pull down tab 306. The "do1" shown on pull down tab 306 represents digital output 1, which corresponds to digital output module 230. The "value" is used to indicate whether the PID module 208 is to be disabled when a signal is present ("true") or enabled when a signal is present ("false"). Selection of the "false" value on value pull down tab indicates that there must be an output from the digital output module 230 for the PID module 208 to produce an output other than a minimum output.

The name of the process variable source for the PID module 208 is "PID1PVSrc {F}". The source for the process variable for the PID module 208 is selected to be the function module 220 as shown by the "function" value on pull down tab 310. The value of "1" in the editable field 312 indicates that the first and, in this embodiment, only function module 220 will be provide the input.

The name of the set point source for the PID module 208 is "PID1SPSrc {F}" shown in FIG. 11B. The identification of a source type as "nviPercent" in pull down tab 314 corresponds to the network percentage input module 192. The value "1" in the source number editable field 316 identifies the first input to the network percentage input module 192 as the input to be routed to the PID module 208 as a set point.

The name of the output that is provided by the function module 220 is "Fnc1Cfg {F}" as shown in FIG. 11C. The identification of a function type as "minimum" in the pull down tab 318 indicates that the function module 220 will evaluate the input signals it receives and provide the smallest or minimum input as the output. The number of inputs that are to be evaluated is selected to be "2.0" in the editable field 320. Accordingly, the function module 220 will only evaluate the first two identified inputs. The inputs to the function module 220 are identified by the name "Fnc1Src {F}". The value of "pviPercent" in editable fields 322 and 324 indicate that the process variable will be indicative of a percentage. The value "5.0" and "6.0" in the source number editable fields 326 and 328, respectively, correspond to the voltage input modules 204 and 206, respectively.

Configuration of the PID module 210 in the hot water converter example is effected in a manner similar to the configuration of the PID module 208. Thus, as shown in FIG. 11D, the PID module 210 is configured to manipulate temperature data by selection of the "temperature" value in the unit pull down tab 326. The enable signal for the PID module 210 is selected to be from the voltage input module 202 functioning as a switch by the value "di4" in the type pull down tab 328 and the "False" value selected in the value pull down tab 330.

The input source for the process variable supplied to the PID module 210 is selected to be a sensed temperature by the value "pviTemp" in the source type pull down tab 332, which is passed from the voltage input module 202 as selected by the value "3.0" in the source number editable field 334. The value "map" in the source type pull down tab 336 shown in FIG. 11E configures the set point for the PID module 210, named "PID2SPSrc {F}", to be received from the map module 222.

The map module 222 configuration is established as shown in FIG. 11F. The map module is shown configured to receive and output temperature signals as indicated by the "Map1Cfg {F}" value of "temperature" in the in type drop down tab 338 and out type drop down tab 340. The input to the map module 222 is configured by setting the "Map1Src {F}" value. The source type is selected to be "nviTemp" on the source type drop down bar 342 indicating the input is from the network temperature input module 190. The first input to the network temperature input module 190 is identified as the input to the map module 222 by the "1.0" value in the source number editable field 344.

The analog output modules 224, 226 and 228 are configured by setting the values shown in FIG. 11G-I. Beginning with FIG. G, the analog output module 224 is configure to receive input ("AO1Src {F}") from the PID module 210 as set by the "pid" value selected in the source type drop down tab 346 indicating the value is from a PID module and the "2.0" value in the source number editable field 348 indicating that the specific PID module providing the input is the PID module 210.

The analog output module 226 is configured in the same way as indicated by the "pid" value selected in the source type drop down tab 350 indicating the value is from a PID module and the "2.0" value in the source number editable field 352 indicating that the specific PID module providing the input is PID module 210. The difference between the analog output module 224 and the analog output module 226 is shown with reference to other values for the output modules that are set by the user. Specifically, the output of the analog output module 224, indicated by the value "AO1OutRange {F}", varies between "0" and "100" percent as established by the values in minimum percent editable field 354 and maximum percent editable field 356, respectively, in proportion to a received signal ("AO1InRange {F}") between "0" and "33" percent as established by the values in minimum percent editable field 358 and maximum percent editable field 360, respectively. Thus, when an input signal of 33% is received, the analog output module 224 will command the low range steam valve 170 to be 100% open.

In contrast, the output of the analog output module 226, indicated by the value "AO2OutRange {F}", varies between "0" and "100" percent as established by the values in minimum percent editable field 362 and maximum percent editable field 364, respectively, in proportion to a received signal ("AO2InRange {F}") between "33" and "100" percent as established by the values in minimum percent editable field 366 and maximum percent editable field 368, respectively. Thus, until an input signal of more than 33% is received, the analog output module 226 commands the high range steam valve 172 to be fully shut. The analog output module 226 only begins to open the high range steam valve 172 after the input signal from the PID module 210 exceeds 33%.

Referring now to FIG. 11I, the analog output module 228 is configured to control the speed of the water pump 134 by configuring the analog output module 228 to receive input ("AO3Src {F}") from the PID module 208 as set by the "pid" value selected in the source type drop down tab 366 indicating the value is from a PID module and the "1.0" value in the source number editable field 368 indicating that the specific PID module providing the input is the PID module 208.

The naming convention discussed above may also be used to identify the potential inputs and outputs of a configurable controller. In naming the inputs and outputs, it is preferred to associate names with the physical components having the same number. Thus, temperature input number 3 is preferred to be associated with physical input number 3. Accordingly, by way of example, but not of limitation, non-network inputs for the configurable controller 112 may be named and assigned as follows:

| NAME | TYPE | Initial Assignment |
| --- | --- | --- |
| PviSpaceTemp | DQAI_temp | Stat |
| PviSpaceTempStpt | DQAI_temp | Stat |
| PviStatSwitch | DQDI_boolean | Stat |
| PviIn1Temp | DQAI_temp | In1 |
| PviIn2Temp | DQAI_temp | In2 |
| PviIn3Temp | DQAI_temp | In3 |
| PviIn4Temp | DQAI_temp | In4 |
| PviIn5Temp | DQAI_temp | In5 |
| PviIn6Temp | DQAI_temp | In6 |
| PviIn1DI | DQDI_boolean | |
| PviIn2DI | DQDI_boolean | |
| PviIn3DI | DQDI_boolean | |
| PviIn4DI | DQDI_boolean | |
| PviIn5DI | DQDI_boolean | |
| PviIn6DI | DQDI_boolean | |
| PviIn3Pct | DQAI_percent | |
| PviIn4Pct | DQAI_percent | |
| PviIn5Pct | DQAI_percent | |
| PviIn6Pct | DQAI_percent | |

Similarly, the non-network outputs for the configurable controller 112 may be named and assigned as follows:

| NAME | TYPE | Initial Assignment |
| --- | --- | --- |
| PvoAO1 | DQAO_percent | AO1 |
| PvoAO2 | DQAO_percent | AO2 |
| PvoAO3 | DQAO_percent | AO3 |
| PvoDO1 | DQDO_boolean | DO1 |
| PvoDO2 | DQDO_boolean | DO2 |
| PvoDO3 | DQDO_boolean | DO3 |
| PvoDO4 | DQDO_boolean | DO4 |
| PvoDO5 | DQDO_boolean | DO5 |
| PvoDO6 | DQDO_boolean | DO6 |
| PvoDO7 | DQDO_boolean | DO7 |
| PvoDO8 | DQDO_boolean | DO8 |
| PvoMtr1 | DQDO_motor | |
| PvoMtr2 | DQDO_motor | |
| PvoMtr3 | DQDO_motor | |
| PvoMtr4 | DQDO_motor | |

The configurable controller 112 may further accept or provide network variables named as follows:

| NAME | TYPE | INPUT/OUPUT |
|---|---|---|
| NvoSpaceTemp | SNVT_temp_p | O |
| NvoSpaceTempStpt | SNVT_temp_p | O |
| NvoInxTemp (where x = 1 to 6) | SNVT_temp_p | O |
| NvoInxDI (where x = 1 to 6) | SNVT_switch | O |
| NvoInxPct (where x = 3 to 6) | SNVT_lev_percent | O |
| NvoStatusAOx (where x = 1 to 3) | SNVT_lev_percent | O |
| NvoStatusDOx (where x = 1 to 8) | SNVT_switch | O |
| NviOvrdAOx (where x = 1 to 3) | SNVT_lev_percent | I |
| NviOvrdDOx (where x = 1 to 8) | SNVT_switch | I |
| NvoPIDx (where x = 1 to 4) | SNVT_lev_percent | O |
| NviPIDxOvrd (where x = 1 to 4) | SNVT_lev_percent | I |
| NviTempx (where x = 1 to 4) | SNVT_temp_p | I |
| NviPctx (where x = 1 to 4) | SNVT_lev_percent | I |
| NvoFlowx (where x = 1 to 2) | SNVT_flow | O |
| NviPIDDisable | SNVT_switch | I |

Similarly, the configurable controller 112 may accept or provide network configuration properties named as follows:

| NAME | TYPE |
|---|---|
| NciInFilTime | UNVT_time_sec_6 |
| NciBypassTime | SNVT_time_min |
| NciTempStptLimits | UNVT_temp_range |
| NciFlowxCfg (where x = 1 to 2) | UNVT_flow_cfg |
| NciFlowxSrc (where x = 1 to 2) | UNVT_src_select |
| NciPIDxPVSrc (where x = 1 to 4) | UNVT_src_select |
| NciPIDxSPSrc (where x = 1 to 4) | UNVT_src_sel_sp |
| NciPIDxDisSrc (where x = 1 to 4) | UNVT_disable_sel |
| NciPIDxCfg (where x = 1 to 4) | UNVT_pid_cfg |
| NciPIDxCntr (where x = 1 to 4) | UNVT_pid_temp_pct |
| NciFnc1Cfg | UNVT_fnc_cfg |
| NciFnc1Src | UNVT_src_sel_4 |
| NciFnc1ConstA | UNVT_temp_pct |
| NciMap1Cfg | UNVT_map_cfg |
| NciMap1Src | UNVT_src_select |
| NciMap1BrkIn | UNVT_map_brkpt |
| NciMap1BrkOut | UNVT_map_brkpt |
| NciAOxSrc (where x = 1 to 3) | UNVT_src_sel_cst |
| NciAOxInRange (where x = 1 to 3) | UNVT_pct_range |
| NciAOxOutRange (where x = 1 to 3) | UNVT_pct_range |
| NciAOxDisSrc (where x = 1 to 3) | UNVT_dis_sel_dly |
| NciDOxSrc (where x = 1 to 8) | UNVT_src_sel_cst |
| NciDOxCfg (where x = 1 to 8) | UNVT_DO_cfg |
| NciDOxDisSrc (where x = 1 to 8) | UNVT_dis_sel_dly |
| NciMtrx (where x = 1 to 4) | UNVT_motor_3pos |
| NciMtrxSrc (where x = 1 to 4) | UNVT_src_sel_cst |
| NciMtrxLim (where x = 1 to 4) | UNVT_pct_range |
| NciMtrxDisSrc (where x = 1 to 4) | UNVT_pct_range |
| NciNvFailVal | UNVT_4_temp_4_pct |

The foregoing naming convention may further be applied to identifying the various sources of data within a configurable controller. Thus, each component may be assigned a unique name/number combination. For example, applying such an approach the configurable controller 112 results in the following sources:

| VALUE | ENUMERATION | VALID NUMBERS |
|---|---|---|
| 0 | STAT_TEMP | 1 |
| 1 | STAT_SETPT | 1 |
| 2 | PVI_TEMP | 1-6 |
| 3 | PVI_PERCENT | 3-6 |
| 4 | NVI_TEMP | 1-4 |
| 5 | NVI_PERCENT | 1-4 |
| 6 | PID | 1-4 |
| 7 | MAP | 1 |
| 8 | FUNCTION | 1 |
| 9 | NCI_TEMP | 1 |
| 10 | NCI_PERCENT | 1 |
| 11 | AIRFLOW | 1-2 |

The ability to configure a controller in accordance with the present invention provides a great deal of flexibility with respect to the use of the controller for a variety of applications. However, the various applications do not all require the same number of modules to be used. By way of example, the configuration of configurable controller 112 shown in FIG. 6 shows that only PID modules 208 and 210 are used, while the configuration shown in FIG. 8 utilizes all four PID modules. Obviously, programming processor within the configurable controller to only execute modules that are used in specific application would optimize the operation of the processor. Nonetheless, by programming the processor to execute every module, there is no need to specially program the configurable controller for a particular application. Accordingly, in a preferred embodiment, the processor within the configurable controller is programmed to execute each module, even those modules that are not being used in the particular application.

Referring again to the configurable controller 112, the NEURON® 3150 processor can only perform a limited number of tasks in any given period of time, as is true of any processor. However, the number of modules programmed into the configurable controller 112 does not permit the processor to execute all of the modules every second. Accordingly, in one embodiment, different modules are executed at different intervals. Thus, various modules and functions are allocated to different tasks, tasks "0-7", each task having a pre-determined execution frequency. In deciding the task to which various modules and functions are assigned, the stability of the input data and the needed precision of the output data are considered as is discussed below.

The task "0" components are executed every 200 ms. Motor components are allocated to this task because the frequency of the execution is directly related to the precision with which a valve can be positioned. Accordingly, the processor executes motor output modules 246, 248, 250 and 252 every 200 ms. Specifically, the generation of an output based upon previously received inputs is evaluated.

The task "1" components are executed every second. The thermistor input modules 196 and 198 are assigned to this task and are read every second. Similarly, the voltage input modules 200, 202, 204 and 206 are read every second. Additionally, the input to the motor output modules 246, 248, 250 and 252 is updated every second. Thus, since the output of the motor modules is updated every 200 ms, the data obtained in this task may be used by the motor output modules 246, 248, 250 and 252 a number of times.

The PID module 208 is also executed every second. Moreover, the input process variable and the input set point to the PID module 208 are updated with this frequency. However, to allow for the needed speed of execution, the PID enable and the Kr gain computation for the PID module 208 has been separated from the other computations for the PID module 208, and are executed in task 5 as discussed below.

A 5 second power up pulse is also executed under the task "1". The power up pulse is used to synchronize the floating motors and initialize the airflow filter upon initial power up.

The PID module 210 is executed under task "2", with a two second execution frequency. The enable, process variable, and set point inputs for the PID module 210 are also updated under task "2", along with the enable, process variable, and set point inputs for the PID module 212. Various subcomponents from other modules are included under task "2" to allow for the other modules to run in a one second task. Specifically, the source index for the analog output modules 224, 226 and 228 and the map module 222, a bypass time conversion, and a map module 222 break select component are executed under task "2".

The PID module 214 is executed under task "3". The enable, process variable, and set point inputs for the PID module 214 are also updated under task "3". Task "3" is executed every twenty seconds.

Task "4" components are executed every 2 seconds. Task "4" operations include updating the enable signal for the analog output modules 224, 226 and 228, and the motor output modules 246, 248, 250 and 252. The PID module 212 is also executed under the task "4". Task "4" also reads the input from the STAEFA RTS input module 194. Additionally, the source index subcomponents for the digital output modules 230, 232, 234, 236, 238, 240, 242 and 244 are also executed under task "4".

Task "5" components are also executed every 2 seconds. The function module 220 is executed under this task along with the update of the inputs to the function module 220. The enable inputs to the digital output modules 230, 232, 234, 236, 238, 240, 242 and 244 are also updated under this task. Additionally, subcomponents for the PID module 208 that were not executed under task "1" to save execution time are executed under this task. Specifically, the enable input, and the sources for the process variable and set point inputs are updated and calculations for the proportional gain, scaling values and dead band are done under this task. Additionally, the source inputs for the motor output modules 246, 248, 250 and 252 are updated under task "5" as are network configuration inputs.

The digital output modules 230, 232, 234, 236, 238, 240, 242 and 244 are executed at a one second frequency under task "6". The air flow module 216 is also executed and its input is updated under this task. The inputs from network temperature input module 190 and network percentage input module 192 are also read under task "6".

The air flow module 218 is executed and its input is updated under task "7" at a one second interval. The inputs to the analog output modules 224, 226 and 228 are updated and the modules are executed under this task. Additionally, the input for the map module 222 is updated and the module is executed under task "7". Input from the bypass button is also monitored at a one second interval under this task.

The tasks and components discussed above are shown in the following table:

| Task | Component |
|---|---|
| 0 | Motor 1-4 |
| 1 | Input 1_2 |
|  | Input3_6 |
|  | Mtr1-4sel |
|  | PID1 |
|  | PID1selA |
|  | PID1selB |

| Task | Component |
|---|---|
|  | PowerUp |
| 2 | PID2-3 |
|  | PID2-3En |
|  | PID2-3selA |
|  | PID2-3selB |
|  | T7Aoindex |
|  | T7BypassTime |
|  | T7Map1brksel |
|  | T7Map1inex |
|  | T7nc |
| 3 | PID4 |
|  | PID4En |
|  | PID4selA |
|  | PID4selB |
| 4 | AO1-3En |
|  | Mtr1-4En |
|  | MtrSyncA |
|  | PID3 |
|  | SpcTemp |
|  | SpcTempStpt |
|  | T6DOIndex |
| 5 | DO1-8En |
|  | Function1 |
|  | Function1SelA |
|  | Function1SelB |
|  | PID1En |
|  | T1PID1units |
|  | T1PIDindex |
|  | T1nc |
| 6 | Airflow1 |
|  | Airflow1Sel |
|  | DO1-8 |
| 7 | AO1-3 |
|  | Airflow2 |
|  | Airflow2Sel |
|  | BypassButton |
|  | Map1 |
|  | Map1SelA |
|  | Map1SelB |

While the present invention has been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

We claim:

1. A method of configuring an electrical controller in a network comprising:
   providing a controller having a standard communications protocol with a predetermined first and a predetermined second data processing component to a user, each of the first and second data processing components having a first input and an output;
   providing a network management tool to the user;
   enabling the user to configure the controller with the network management tool such that the output of the first data processing component is operably connected to the first input of the second data processing component; and
   configuring the controller in response to user input received through the network management tool such that the output of the first data processing component is operably connected to the first input of the second data processing component.

2. The method of claim 1, wherein:
providing a controller comprises providing a controller with a first controller input and a controller output; and
configuring comprises
operably connecting the first controller input to the first input of the first data processing component, and
operably connecting the second data processing component output to the controller output.

3. The method of claim 2, wherein:
providing a controller further comprises
providing a controller with a second input and
providing the second data processing component with a second input; and
configuring comprises
operably connecting the second input of the controller to the second input of the second data processing component.

4. The method of claim 1, wherein the first and the second data processing components are proportional-integral-derivative components, and wherein configuring comprises providing the output of the first data processing component as a set point to the second data processing component.

5. The method of claim 1, wherein:
providing a controller comprises providing a controller with a first controller input and a controller output; and
configuring comprises operably connecting the first controller input to the controller output.

6. A controller assembly comprising:
a set of input modules configured to be coupled to receive signals from a select set of inputs from a building automation system;
a set of output modules configured to be coupled to provide signals to a select set of outputs in a building automation system; and
a set of process control modules programmed in at least one read only memory in the controller and including at least a first process control module and a second process control module, the first process control module of a type different from the second process control module, the set of process control modules operable to be configured by a user in one of a plurality of possible configurations, each possible configuration defining (i) a set of user selectable connections between the set of input modules and the set of process control modules, (ii) a set of user selectable connections between the set of output modules and the set of process control modules, and (iii) a set of user selectable connections among process control modules in the set of process control modules.

7. The controller assembly of claim 6 wherein the set of process control modules includes a plurality of loop controllers, each loop controller operable to receive a set point and a value based on a monitored parameter, each loop controller operable to generate an output variable based on the value and the set point.

8. The controller assembly of claim 7 wherein at least one loop controller is a proportional-integral-derivative controller.

9. The controller assembly of claim 7 wherein the plurality of possible configurations includes at least one configuration wherein at least one process control module is unused.

10. The controller assembly of claim 9 wherein the set of process control modules includes at least one statistical function component.

11. The controller assembly of claim 9 wherein the set of process control modules includes at least one data mapping component.

12. The controller assembly of claim 6 wherein each process control module of the set of process control modules comprises a software routine executed by a processor.

13. The controller assembly of claim 6 further comprising a sequencer configured to process each of the set of inputs, each of the set of outputs, and each of the set of process control modules in a predetermined order.

14. The controller assembly of claim 6, wherein the set of input modules are operable to be configured in one of a plurality of possible configurations, each possible configuration defining a user selectable set of connections between the set of input modules and the set of output modules.

15. The controller assembly of claim 14, wherein the set of output modules comprises a digital output module operable to receive a signal from one of the set of input modules indicative of a percentage value and to provide a digital output signal.

16. A controller assembly comprising:
a housing;
a plurality of input terminals operably connected to a building automation system, the plurality of input terminals supported by said housing;
a plurality of output terminals operably connected to the building automation system, the plurality of output terminals supported by said housing;
a processing circuit supported by said housing, the processing circuit pre-programmed into at least one read only memory to perform at least four loop control functions, the processing circuit operably coupled to the plurality of input terminals and the plurality of output terminals; and
a memory operably coupled to the processing circuit and operably configured to store configuration information selected by a user, the configuration information identifying logical input connections and logical output connections for each of the four loop control functions;
wherein the processing circuit operably provides at least one output value based on at least one input value received from at least one of the plurality of input terminals to at least one of the plurality of output terminals based on the stored configuration information.

17. The controller assembly of claim 16 wherein the processing circuit is further operable to perform a statistic function, and wherein the stored configuration information identifies logical input and output connections for the statistic function.

18. The controller assembly of claim 17 wherein the processing circuit is further operable to perform a mapping function, and wherein the stored configuration information identifies logical input and output connections for the mapping function.

19. The controller assembly of claim 16 wherein the processing circuit is further operable to perform at least three proportional-integral-derivative loop control functions.

20. The controller of claim 16, wherein:
the memory is field programmable:
the controller further comprises a read only memory; and
the at least four loop control functions are programmed in the read only memory.

21. The controller of claim 16, wherein the processing circuit is further operable to connect at least one of the plurality of input terminals to at least one of the plurality of output terminals.

* * * * *